(12) United States Patent  (10) Patent No.: US 7,631,602 B2
Schwenker  (45) Date of Patent: Dec. 15, 2009

(54) LOW PROFILE VEHICLE TURNTABLE

(76) Inventor: William V. Schwenker, 3795 Arroyo Sorrento Rd., San Diego, CA (US) 92130

( * ) Notice: Subject to any disclaimer, the term of this patent is extended or adjusted under 35 U.S.C. 154(b) by 224 days.

(21) Appl. No.: 11/809,497

(22) Filed: Jun. 1, 2007

(65) Prior Publication Data

US 2007/0294957 A1  Dec. 27, 2007

Related U.S. Application Data

(60) Provisional application No. 60/810,577, filed on Jun. 2, 2006.

(51) Int. Cl.
B60S 13/02 (2006.01)
(52) U.S. Cl. ............... 104/44; 104/35; 104/36; 104/38; 104/45
(58) Field of Classification Search ............... 104/35, 104/38, 44
See application file for complete search history.

(56) References Cited

U.S. PATENT DOCUMENTS

| 3,566,798 | A |   | 3/1971  | Peitzman |          |
|-----------|---|---|---------|----------|----------|
| 3,661,386 | A |   | 5/1972  | Green    |          |
| 3,685,079 | A |   | 8/1972  | Dawson   |          |
| 3,765,810 | A | * | 10/1973 | Smarook  | 425/110  |
| 4,265,581 | A |   | 5/1981  | Ives     |          |
| 4,498,398 | A |   | 2/1985  | Vallee   |          |
| 4,608,929 | A |   | 9/1986  | Park     |          |
| 4,716,837 | A | * | 1/1988  | Valencia | 104/38   |
| 4,753,173 | A |   | 6/1988  | James    |          |
| 4,777,884 | A |   | 10/1988 | Seay     |          |
| 4,796,537 | A |   | 1/1989  | Besser   |          |
| 5,086,704 | A |   | 2/1992  | Mueller  |          |
| 5,090,508 | A |   | 2/1992  | Nishikawa|          |
| 5,134,732 | A | * | 8/1992  | Li       | 5/93.1   |
| 5,538,357 | A |   | 7/1996  | Boswell  |          |
| 5,626,079 | A |   | 5/1997  | Summers  |          |
| 5,755,160 | A |   | 5/1998  | Blufordcraving |    |
| 5,794,538 | A | * | 8/1998  | Pitchford| 105/218.1|
| 5,816,638 | A | * | 10/1998 | Pool, III| 296/26.11|
| 6,123,310 | A |   | 9/2000  | Paskiewicz |        |
| 6,382,106 | B1|   | 5/2002  | Knight   |          |
| 6,817,300 | B2| * | 11/2004 | Schwenker| 104/44   |
| 6,877,437 | B2|   | 4/2005  | Murdock  |          |
| 7,188,456 | B2| * | 3/2007  | Knauseder| 52/592.1 |

* cited by examiner

*Primary Examiner*—S. Joseph Morano
*Assistant Examiner*—Zachary Kuhfuss
(74) *Attorney, Agent, or Firm*—McGahey & McGahey; Harry McGahey, Esq.

(57) ABSTRACT

A low profile turntable device constructed of wedge shaped sections with structural foam in between, support rollers on the bottom skin, a plurality of reversible drive motors inside a plurality of outer ramps around the exterior, and a concentric circular and perpendicular lateral band system for mounting the turntable on a surface.

13 Claims, 21 Drawing Sheets

LOW PROFILE VEHICLE TURNTABLE

CROSS-REFERENCE TO RELATED APPLICATIONS

This application is entitled to the benefit of the U.S. provisional patent application No. 60/810,577 filed Jun. 2, 2006 with the United States Patent Office. It is also related to U.S. Pat. No. 6,817,300 B2 in that it is by the same inventor.

STATEMENT REGARDING FEDERALLY SPONSORED RESEARCH FOR DEVELOPMENT

No Federal Funds were used in the development of this Invention.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

There is a need for an inexpensive, easily installed low profile turntable which does not require extensive installation work. This invention has the advantage of only needing a flat surface area sufficient to accommodate the turntable itself, and a sufficiently flat surface to which the invention can be affixed. Vehicles or heavy loads can enter the turntable from any direction because the drive motors are inside the exterior ramps themselves. A concentric ring and perpendicular band construction called a "Spider" or "Spider System" allows precision installation with a minimum of work being required.

2. Description of Related Art

Historical attempts to address some or all of the limitations in prior patented machines have been numerous. Some examples of relevant art include:

U.S. Pat. No. 3,566,798, Mar. 2, 1971, Peitzman, United States (US) is an automobile turntable which must be installed flush with the surface where it is to be used. This requires excavation during the installation process.

U.S. Pat. No. 4,498,398, Feb. 12, 1985, Vallee, United States (US) The current invention construction is simpler and less complex than the Vallee invention.

U.S. Pat. No. 4,608,929, Sep. 2, 1986, Park, United States (US) requires a subsurface installation and therefore requires preparation and excavation of the surface it sits on.

U.S. Pat. No. 4,753,173, Jun. 28, 1988, James, United States (US) uses a cantilever design for strength on the platform, and spoke like members to support the upper deck of the turntable. while the current invention uses wedge shaped sections filled with structural foam giving greater strength and a more uniform upper surface, while decreasing installation complexity.

U.S. Pat. No. 4,777,884, Oct. 18, 1988, Seay, United States (US) must be installed below ground, a feature of installation avoided by the current invention.

U.S. Pat. No. 4,796,537, Jan. 10, 1993, Besser, United States (US) is a mobile truck turntable having a scow like body with a high vertical profile designed for portable use to move heavy trucks. The subject invention has the advantage of being portable, as well as being much lower to the ground with a lower profile.

U.S. Pat. No. 5,086,704, Feb. 11, 1992, Mueller, United States (US) uses a polygonal support frame, but still must be installed with a portion of itself below ground.

U.S. Pat. No. 5,090,508, Feb. 25, 1992, Nishikawa et. al., United States (US) is a turntable with a retractable lift. It is designed for repairing of automobiles and has extensive components as part of it's structure so that it can lift an automobile horizontally. The subject invention does not attempt to raise it's load vertically.

U.S. Pat. No. 5,538,357, Jul. 23, 2000, Boswell, United State (US) consists of a turntable requiring very powerful motors that can lift a vehicle vertically as well as rotate the turntable. The installation required extensive work in the area to be installed. The subject invention does not require as powerful motors since the drive mechanism only rotates a turntable in the horizontal axis. Only ⅓ horsepower motors are necessary for the current invention.

U.S. Pat. No. 5,626,079, May 6, 1997, Summers, United States (US) is a patent for an oscillating turntable for displaying vehicles. It differs from the subject invention because it consists of two vertical tiers of counter rotating turntables, lending to a complexity avoided by the subject invention.

U.S. Pat. No. 5,755,160, May 26, 1998, Blufordcraving, United States (US) is a rotating floor for automobiles but it also has similar disadvantages as the Summer U.S. Pat. No. 5,626,079. It must be installed below ground level, and it requires powerful motors to rotate it. The Subject invention sits on top of any flat ground surface, and the drive mechanism location is such that very little power is required to actually rotate the turntable.

U.S. Pat. No. 6,123,310, Jun. 19, 1998, Paskiewicz, United States (US) is a castor based platform for maneuvering and storing large numbers of motorcycles and other two wheeled vehicles.

U.S. Pat. No. 6,382,106, May 7, 2002, Knight, United States (US) uses tubular construction which makes the turntable high and necessitates a below ground construction.

U.S. Pat. No. 6,877,437, Apr. 12, 2005, Murdock, United States (US) also requires an underground installation which is not required by the subject invention.

BRIEF SUMMARY OF THE INVENTION

This improved turntable device is designed for parking, displaying, rotating and maneuvering vehicles or other large or heavy items. Is has the significant advantage over prior art in that the turntable can be installed and operated on asphalt, cement, carpet, marble or any reasonably smooth surface. It can be installed permanently or it can be portable. Another significant advantage is that the drive motors are integrated and hidden inside the ramps around the circumference of the turntable, therefore nothing protrudes above the surface pan of the turntable. Drive motors do not have to be high powered. One embodiment operates with only ⅓ horsepower motors. Also the turntable can be entered or exited from any point on the outer circumference. Another advantage is that there is nothing protruding above the surface pan which can hit a low automobile air dam or chassis component on a vehicle or other item with low ground clearance. These advantages exist in the present invention because the drive mechanism is completely inside the ramps themselves. These ramps encircle the wedge shaped sections completely.

The invention integrates the low profile ramps and motors into the required precision assembly using a series of concentric circular bands anchored in position and connected to one or more neighboring circular bands using perpendicular lateral bands forming a system called a "Spider System" "Spider Assembly" or "Spider". The spider spreads the load levels over uneven areas of the surface it is placed on. In the preferred embodiment these bands are composed of a strong, durable metal.

Another unique feature of the invention is the spider pressure notch. This is an indentation which runs the longitudinal length of the bottom of each individual ramp section to allow the outer circular rim band underneath each half of each ramp section to assist more effectively in distributing the shock load of a car's tire when it first hits the ramp section as the vehicles drive over them. This notch is continuous and sits on top of the outer circular band. The anchor bolts of a permanent installation of the invention would eventually loosen if the spider pressure notch was not present to distribute the shock load as the vehicle tires first hit the ramp sections.

A "motorcycle type suspension system" of the type often used on rear wheels of motorcycles has been adapted for use on the drive motors for this turntable which further compensates for uneven points on the surface the turntable rests upon. This suspension system keeps the pressure on the drive rollers that move the turntable constant and sufficient to efficiently rotate it as required. There is no need for cement work or drilling holes when installing this device. Except on low friction surfaces, the turntable spider assembly is held in place by the weight of the turntable itself, and all of the components of the turntable attach to the concentric and perpendicular bands making up the spider system. This avoids problems encountered by other types of turntables which require that bolts or anchors be placed into the mounting surface during installation. Bolts or anchors placed into the mounting surface are subject to hitting rebar or stones, a complication avoided by the current invention.

In addition, installation using the spider system allows installation upon degraded surfaces such as cracked cement, granulated asphalt, brick, carpet or marble where drilling holes would not be effective or desired. The spider also allows a broader mounting surface for the ramp units. On low friction surfaces anchoring means such as bolts or screws can be inserted through the spider bands and into the surface it rests on.

DETAILED DESCRIPTION OF THE INVENTION

Figure 1:
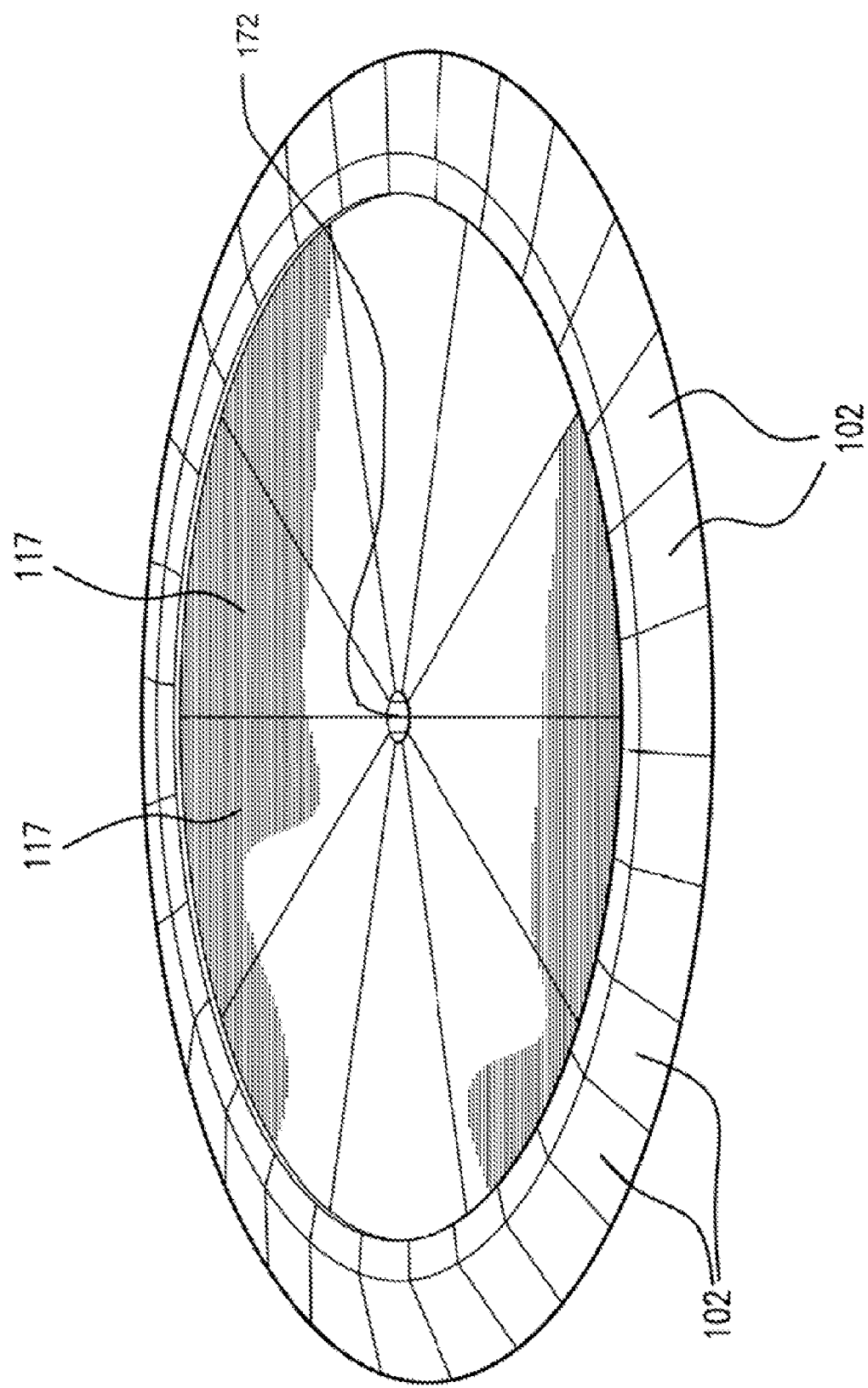
FIG. 1 shows a perspective view from above of a completely assembled turntable.

FIG. 1 shows a perspective view from above of a completely assembled turntable. The individual ramp sections around the exterior of the turntable (102) are shown around the circumference with the pan formed of a plurality of individual foam filled wedge shaped sections (117) joined on each side to a neighbor by a tongue and groove connector system more completely shown in FIG. 11. These wedge shaped sections meet at the narrow ends at a central point covered by a center cover band (172) The preferred embodiment is 10 sections but a lesser or greater number could be used if desired. Each wedge shaped section is comprised of a wedge shaped top and bottom skin placed over a wedge shaped section of structural foam.

Figure 2:
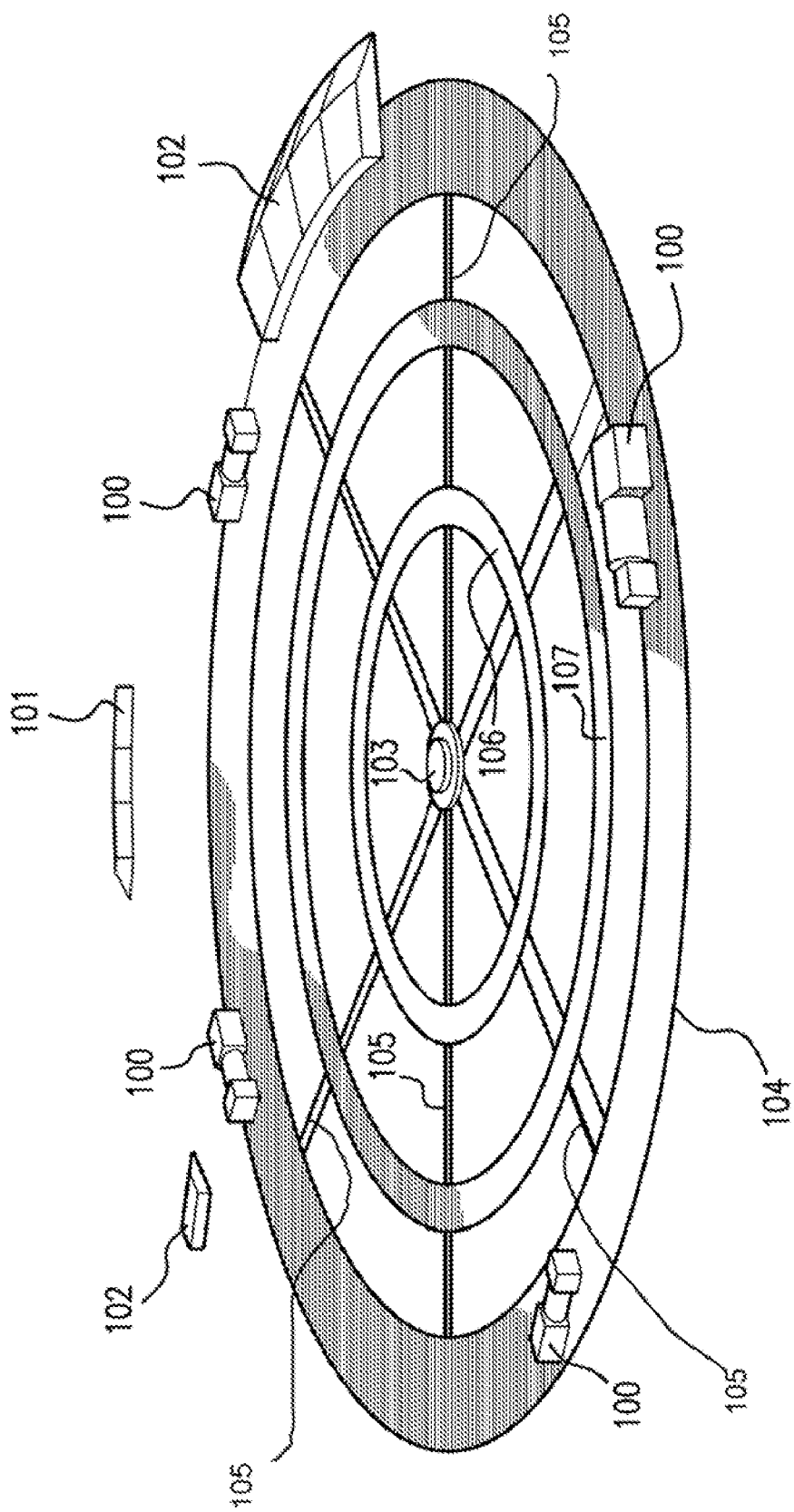
FIG. 2 shows a perspective view from above of a spider assembly with the typical placement of four assembled drive motor units on top of the outer circular rim band of the spider system.

FIG. 2 shows a perspective view from above of the plurality of concentric circular bands anchored beneath the rotating portion of the turntable (104, 106, and 107). These concentric bands are each connected to one or more neighboring concentric circular bands by perpendicular lateral bands (105) which intersect at a central axis point upon which is anchored a lower center hub assembly (103) to form what is called a "Spider", "Spider assembly" or "Spider System". In the preferred embodiment, there are a plurality of assembled drive motor units (100) each of which is inside a plurality of individual ramp sections (101) around the exterior of the turntable. The wedge shaped sections comprising the rotating part of the turntable rotate on top of the series of concentric circular bands (104, 107 and 106) which are connected to each other by the perpendicular lateral bands ((105). Each of the individual ramp sections (101) are attached to an outer circular band (104). The rear faces of three individual ramp sections (101) can also be seen at the top of FIG. 2. Also, an individual ramp section nested between three other ramp sections can be seen at (102). The turntable itself rotates upon a center hub assembly (103) In the preferred embodiment there are six perpendicular lateral bands (105), an inner circular band (106) a middle circular band (107) and an outer circular band (104).

Multiple drive motors are used for each turntable, the number of motors being determined by the expected weight and desired performance speed required for the load expected. The typical preferred embodiment will usually function well with four ⅓ horsepower electric drive motors (100) spaced equally apart, each in their own individual ramp section (101), assuming typical passenger vehicle loads.

In the preferred embodiment, the circular and perpendicular bands which make up the spider components are made of durable metal cut by a laser to the precise shape required but any precision method of cutting may suffice.

The perpendicular lateral bands (105) maintain the correct location of the concentric circular rings under the wheels and maintain the correct position of the motors. This configuration spreads the load slightly wider than the wheels would alone, reduces friction, and provides a consistent friction component for every installation.

Figure 3:
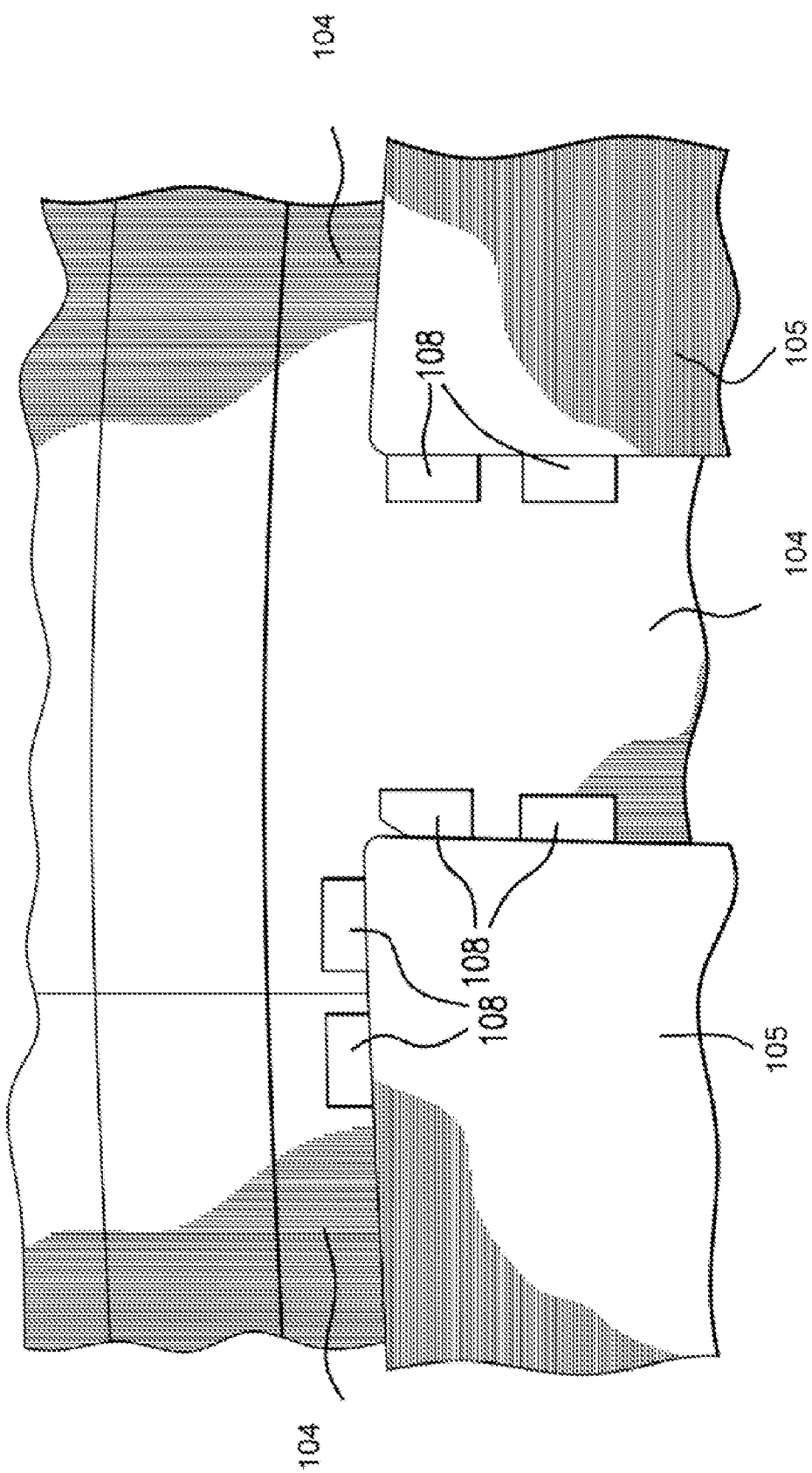
FIG. 3 shows a top view of a portion of two perpendicular lateral bands overlaid on an outer circular rim band section.

FIG. 3 shows a bottom view of portions of two perpendicular lateral bands (105) underlying an outer circular band (104) held together with clip fasteners (108).

Figure 4:
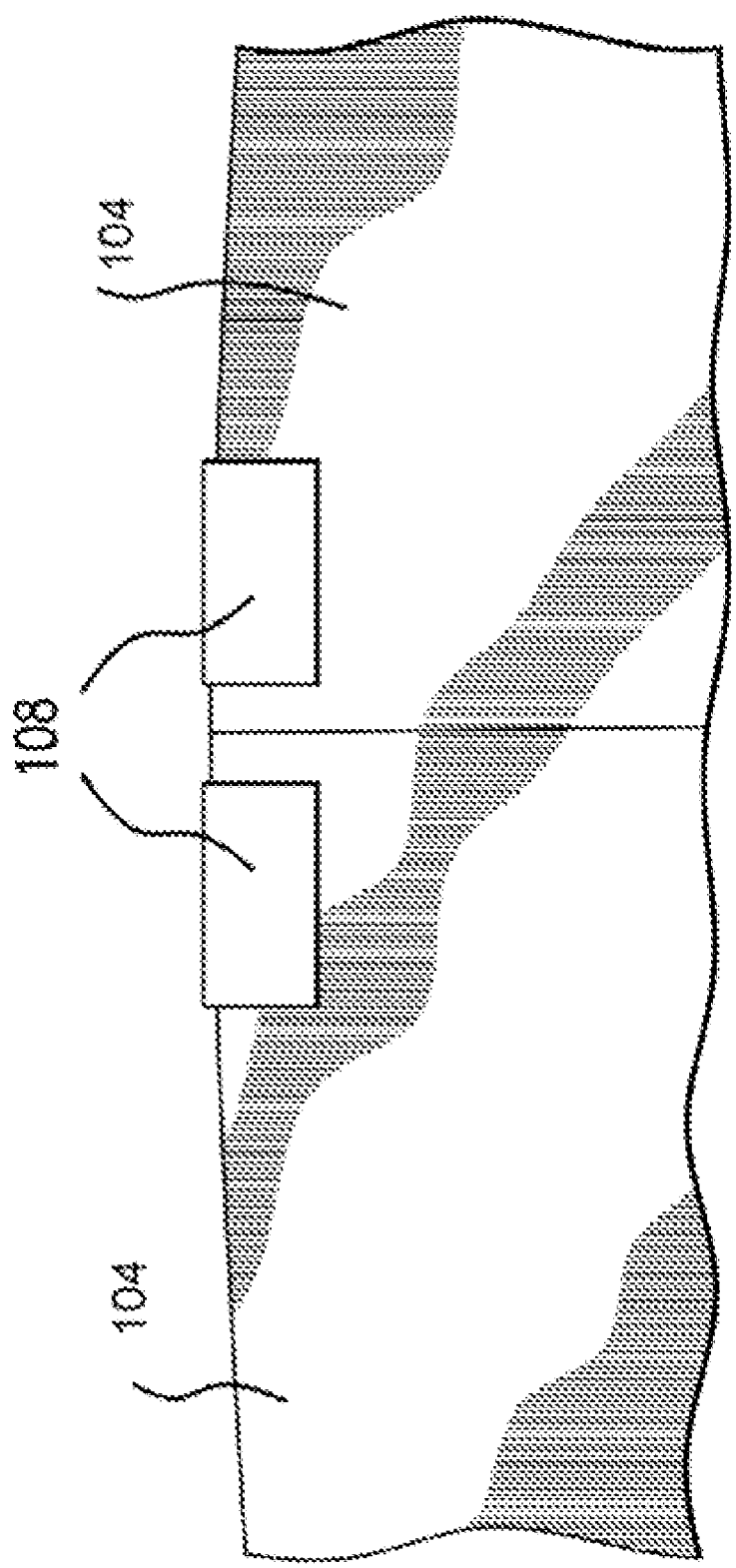
FIG. 4 shows a top view of the joining of two outer circular rim band sections of the spider system with two clip fasteners holding them together.

FIG. 4 shows a top view of two outer spider circular rim band sections (104) with two clip fasteners (108) holding the two outer circular rim band sections together.

Figure 5:
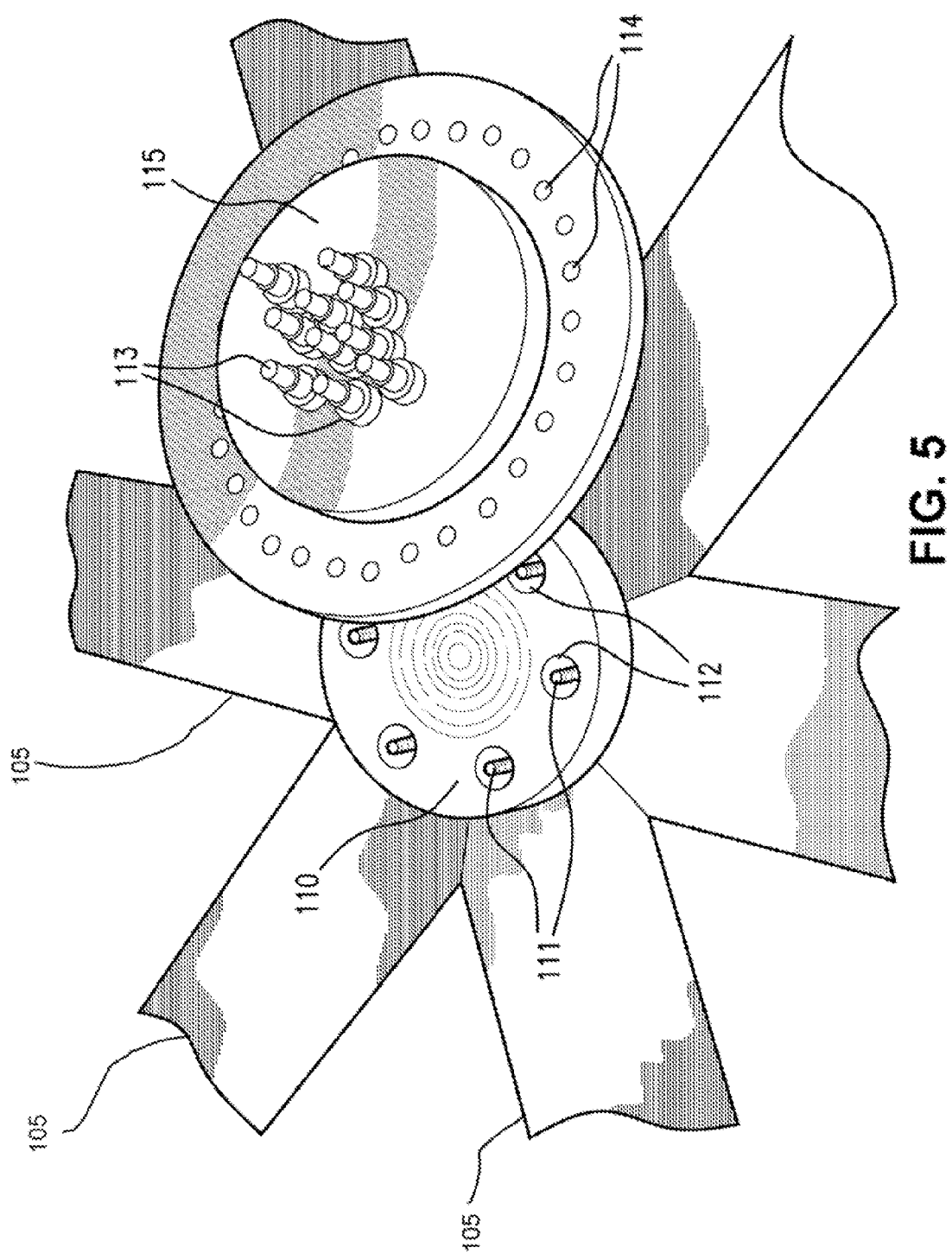
FIG. 5 shows an exploded view of a center hub assembly.

FIG. 5 shows an exploded view of a center hub assembly comprising a lower inner center hub (110) showing the threaded ends of the inner center bearing hub bolts (111) protruding through the lower inner center bearing hub bolt entry orifices (112). These bolts attach the lateral perpendicular bands to the lower inner center hub. Also are shown upper outer center bearing hub bolt entry orifices (114) on the upper outer center bearing hub (115). Resting on top of the upper outer center bearing hub (115) are ten upper outer center bearing hub bolts (113). The lower inner center bearing hub (110) bolts to the central meeting point of the perpendicular lateral bands. The wedge shaped sections with the top and bottom skins over the structural foam connect to the upper outer center bearing hub (115) and rotate around the hub's axis. The number of bolts used to attach the upper and lower center bearing hubs can be more or less than the number shown, so long as a sufficient number are used to maintain the integrity of the unit.

Figures 6, 6A:
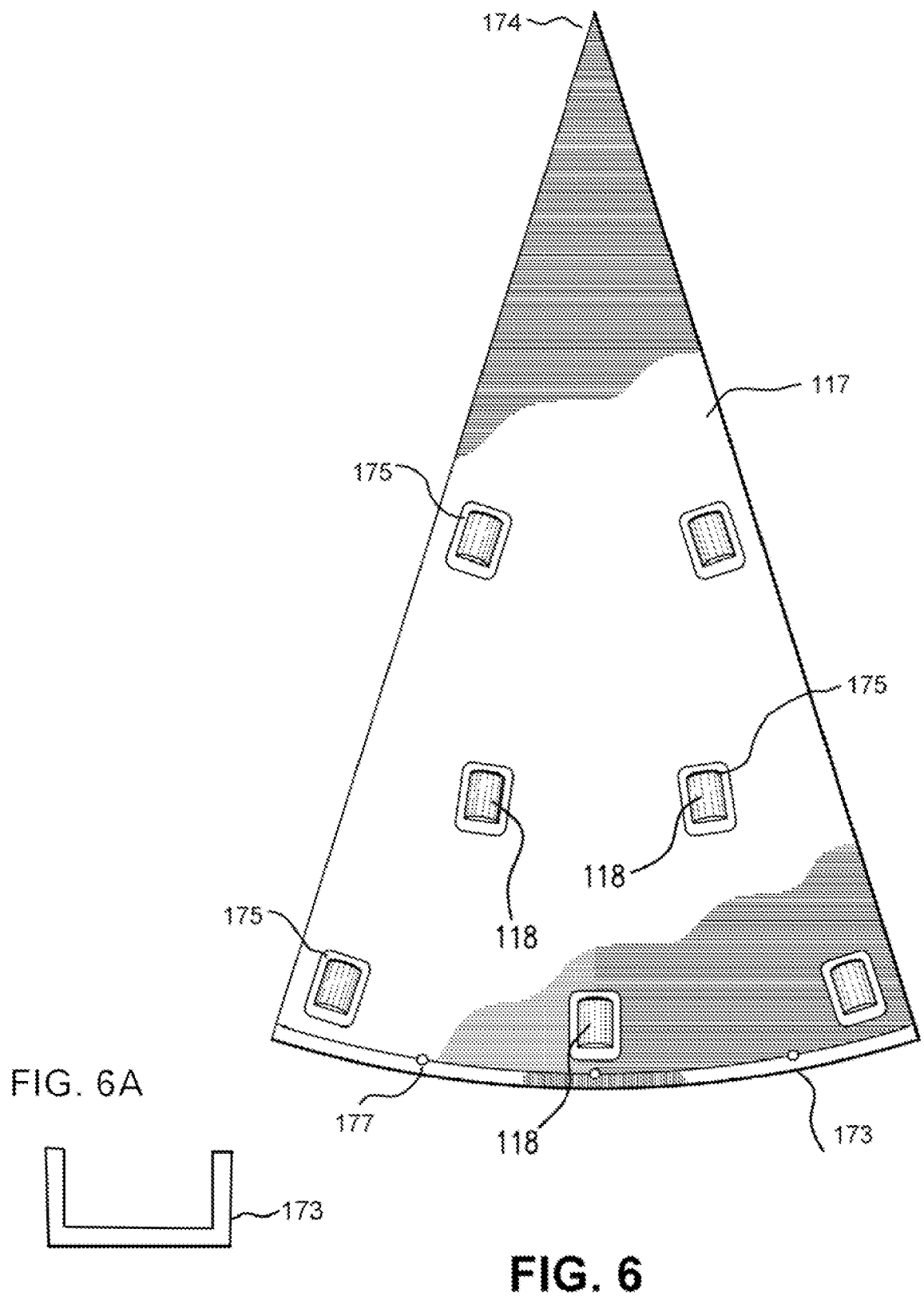
FIG. 6 shows a bottom view of a foam-filled wedge shaped section unit with three rows of installed wheel units.
FIG. 6A shows an end view of the channel shape of the (bull nose)

FIG. 6 shows a bottom view of a foam-filled wedge shaped section unit (117) with the bottom installed wheel units (118). These wedge shaped sections when connected together at the narrow end (174) form the circular pan of the turntable upon which the load is placed. The wheels inside each wheel unit (118) inserted into the bottom skin and protruding into each foam-filled wedge shaped section can be slightly tapered on the ends (175) closest to the narrow end of the wedge shaped sections (174) so that they roll in a circle with less friction. These wheels load substantially all of the weight of the turntable onto the concentric circular bands forming the spider assembly. The outermost, widest, curved end (bullnose) (173) of each foam-filled wedge shaped section (117) forming the pan is made out of the same non-skid when wet specialty stainless steel or equivalent material which the rest of the top of the pan is made of. One commonly available such directional matte finish is manufactured under the commercial name of "Griptex". In the preferred embodiment, the bullnose itself is manufactured using an angle bender. It is made by forming a channel, then bending the channel on an angle bending machine, followed by placing the mounting holes in it with a laser cutter. The outermost, widest curved end of each foam-filled wedge shaped section is bent into a channel shape by using an angle bender means. The wide end of the top skin of each foam-filled wedge shaped section is attached to the upper distal end of the channel formed in the outermost, widest curved end. The preferred embodiment uses structural foam-filled wedge shaped section units (117) comprised of precision formed polyurethane blank casts in a tapered shape. However any sufficiently strong structural foam may be used. FIG. 6A shows an end view of the channel shape of the (bullnose) (173) formed by the angle bender means.

Figure 7:
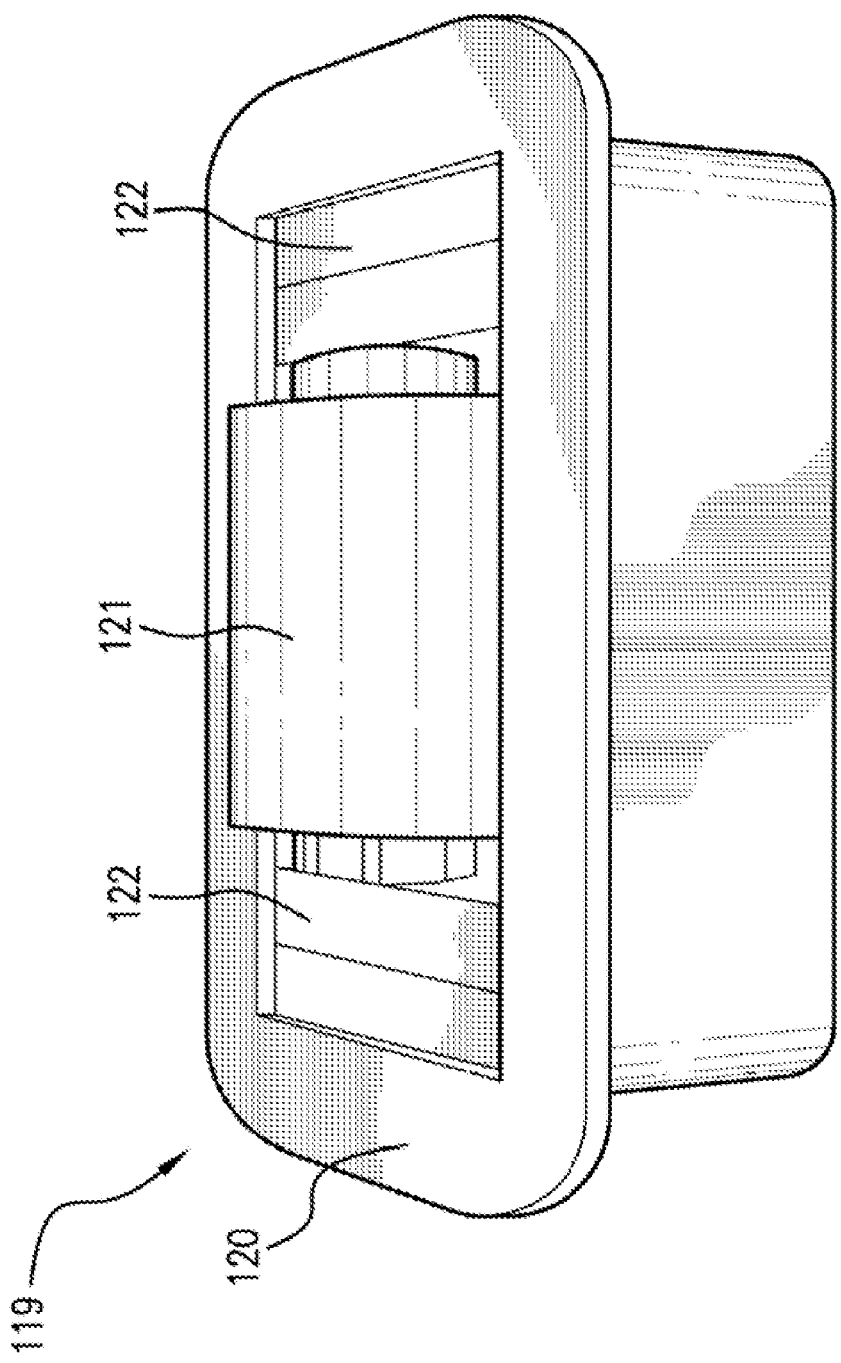
FIG. 7 shows a perspective view of a complete wheel assembly unit.

FIG. 7 shows a perspective view of a wheel assembly unit (119) comprised of a wheel unit housing (120), a wheel (121) and wheel spring clips (122). As noted previously, the wheels can be tapered slightly such that they will roll in a circle by themselves thereby reducing friction.

Figure 8:
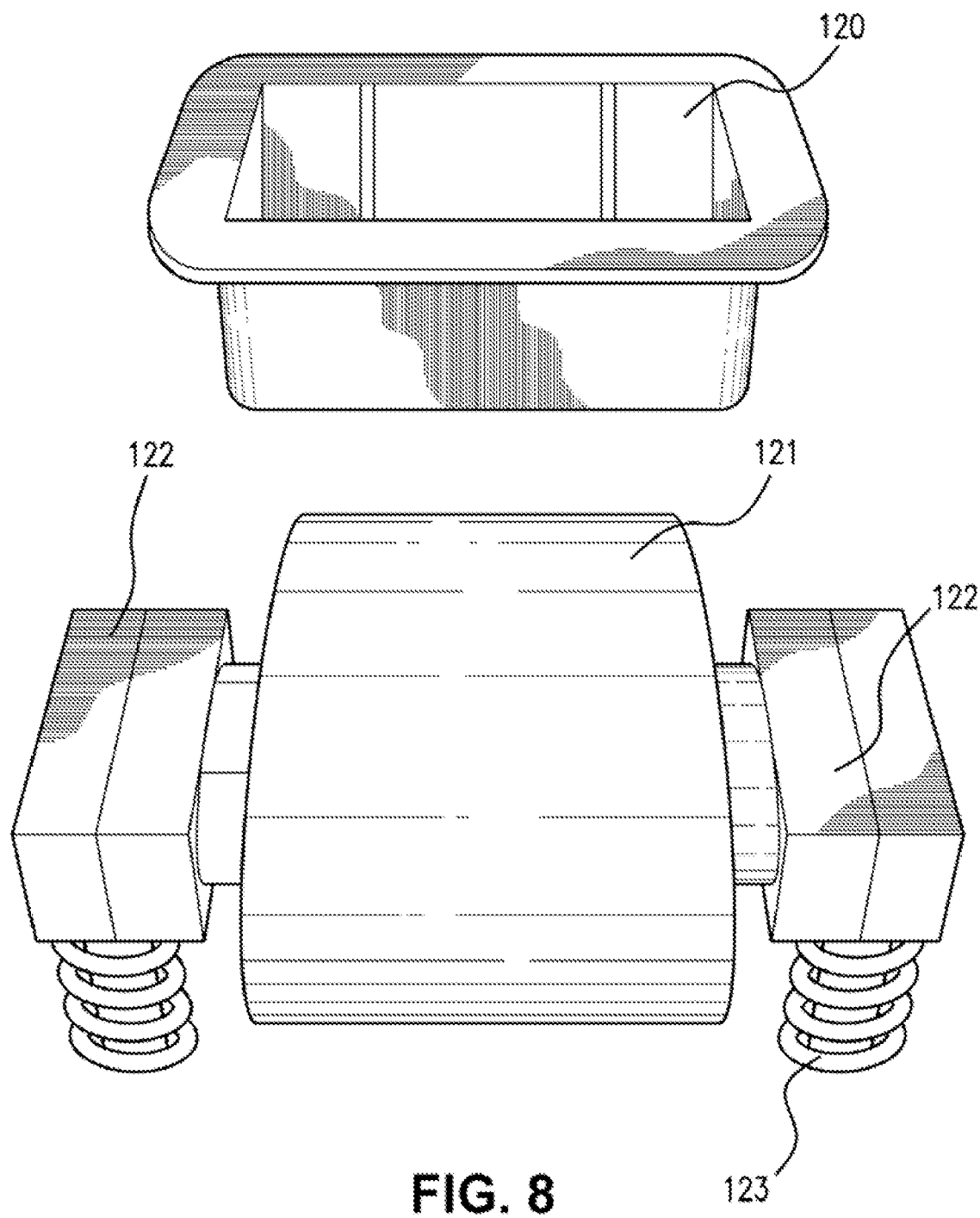
FIG. 8 is a perspective exploded view of a wheel assembly unit.

FIG. 8 is a perspective exploded view of a wheel unit housing (120) of a wheel assembly comprised of a wheel (121) connected to a wheel suspension spring (123) held in place by wheel spring clips (122).

Figure 9:
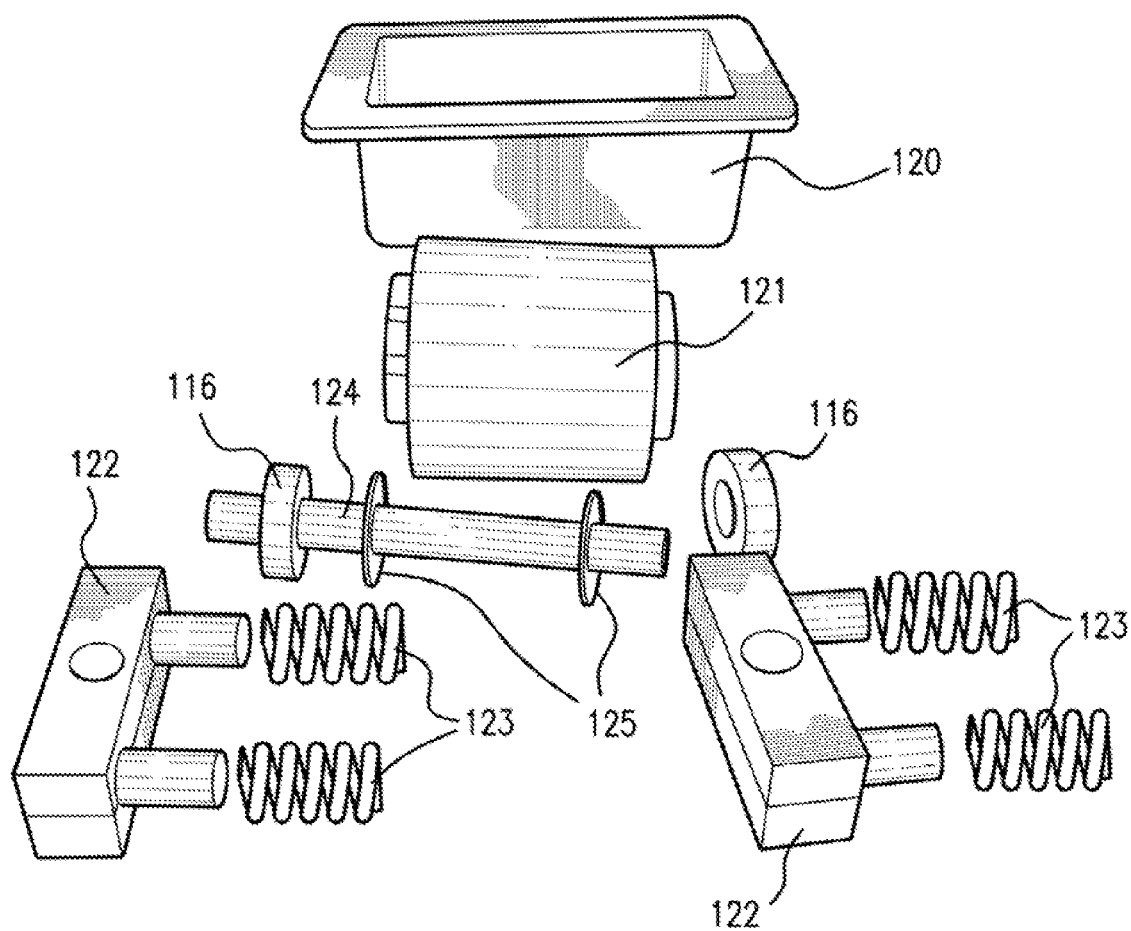
FIG. 9 is an exploded view of a wheel assembly unit showing the spring assembly inside.

FIG. 9 is an exploded view of a wheel unit housing (120) of a wheel assembly unit comprised of a wheel (121), a wheel axle (124), a wheel bearing (116), next to a wheel washer (125). Also shown are the four wheel suspension springs (123) used in the preferred embodiment. In place of these springs polyurethane or other flexible elements such as polyurethane spring pads may also be used. The springs in the Figure shown are held in place by wheel spring clips (122).

Figure 10:
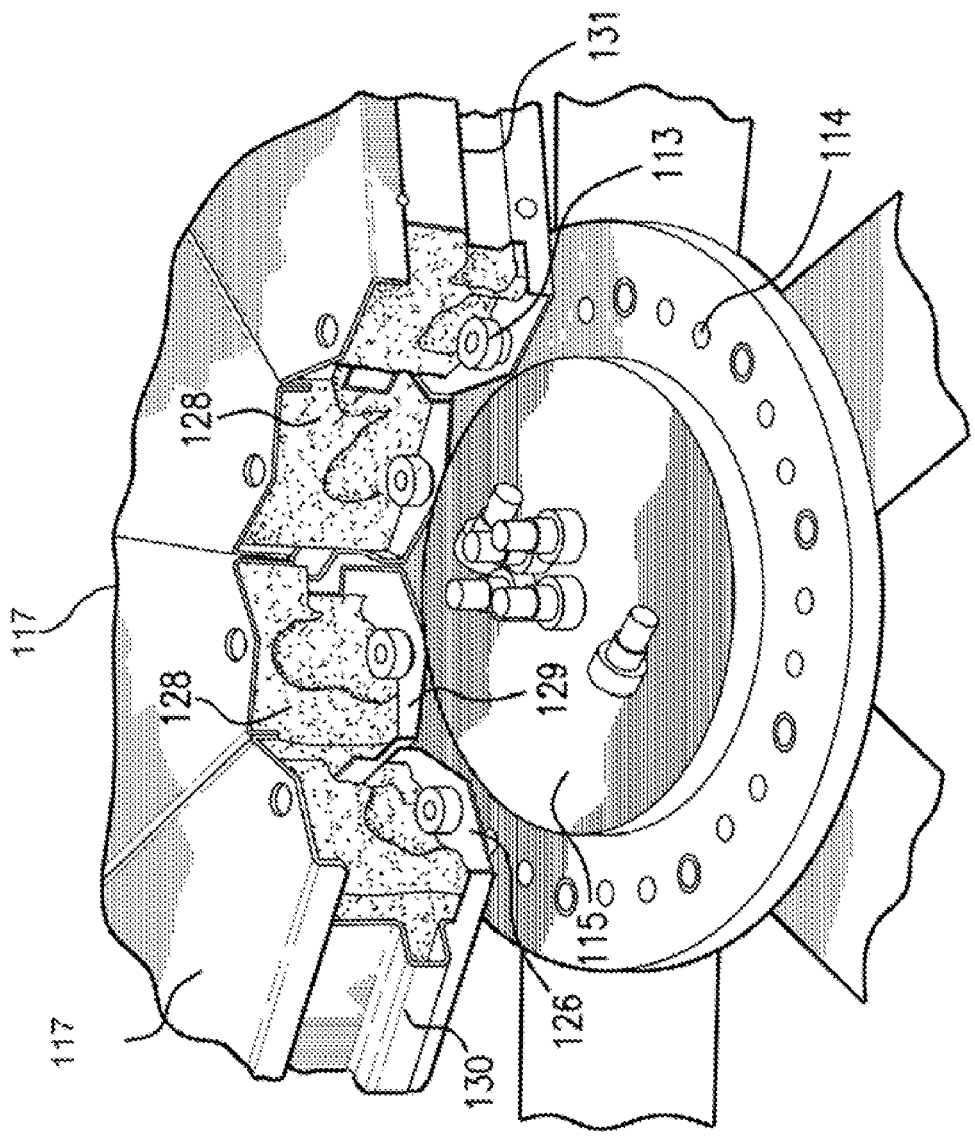
FIG. 10 shows a cut away view of an upper outer center bearing hub as it attaches to the individual wedge shaped sections.

FIG. 10 shows a cut away view of the preferred embodiment of the central pivot point. Shown is a cut away view of an upper outer center bearing hub (115) showing the upper outer center bearing hub bolt entry orifices (114) along the perimeter, as well as four upper outer center bearing hub bolts (113) in place anchoring the foam filled wedge sections (117) to the upper outer center bearing hub (115). Also visible is the structural foam (128) inside the foam-filled wedge sections (117), and portions of the lower bottom skin of a wedge panel (126) shown next to an adjacent lower skin of a wedge panel (129). On the left side of the drawing, one side of a foam filled wedge unit (117) a tongued lateral wedge side unit (130) is visible. On the right side of the drawing is shown a grooved lateral wedge side unit (131). These wedge shaped sections are joined together to form a complete circle using the tongue and groove method shown in FIG. 11.

Figure 11:
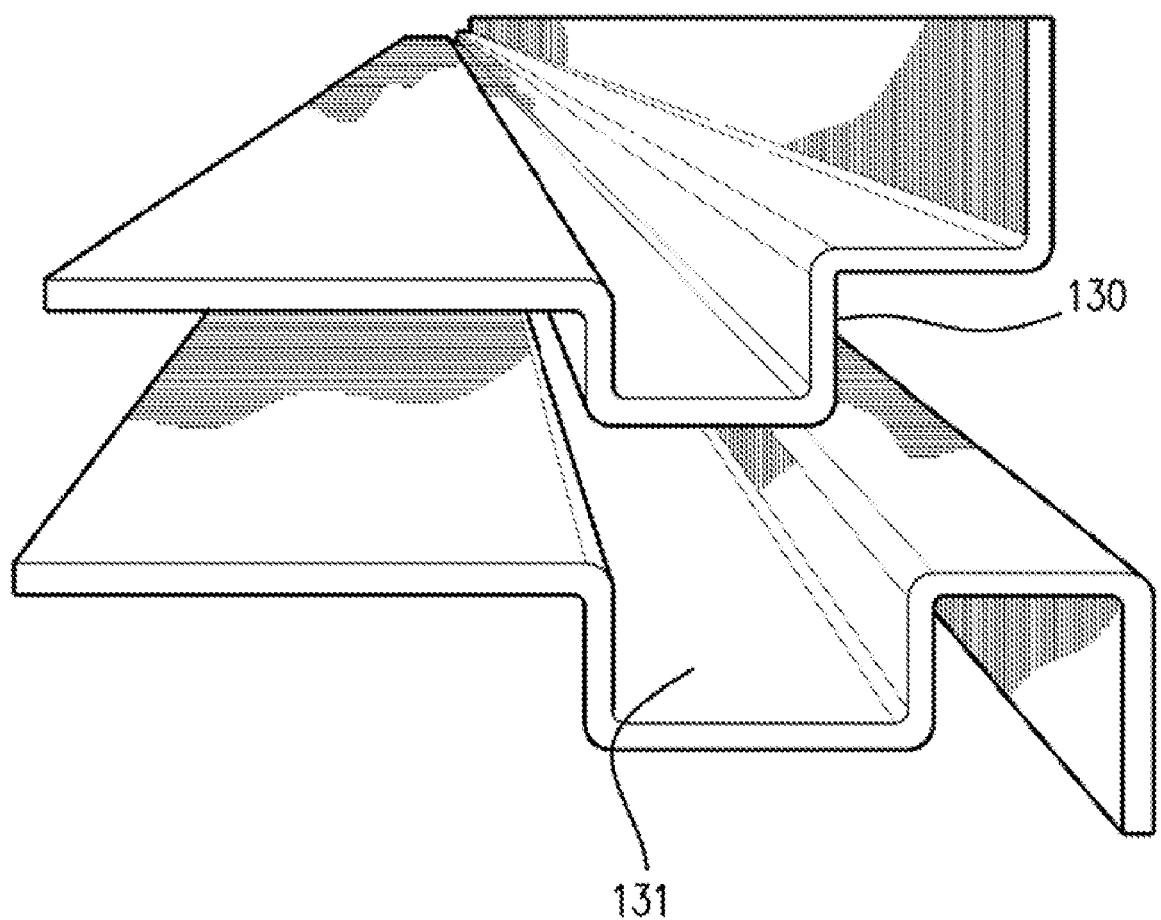
FIG. 11 shows a perspective view of a tongued lateral wedge shaped section side unit being guided into the corresponding grooved lateral wedge shaped section side unit of a neighboring section.

FIG. 11 shows a perspective view of a tongued lateral wedge shaped section side unit (130) being guided into its corresponding grooved lateral wedge shaped section side unit (131). Each foam filled wedge section is joined to its immediately adjacent neighbors using this tongue and groove attachment method.

Figure 12:
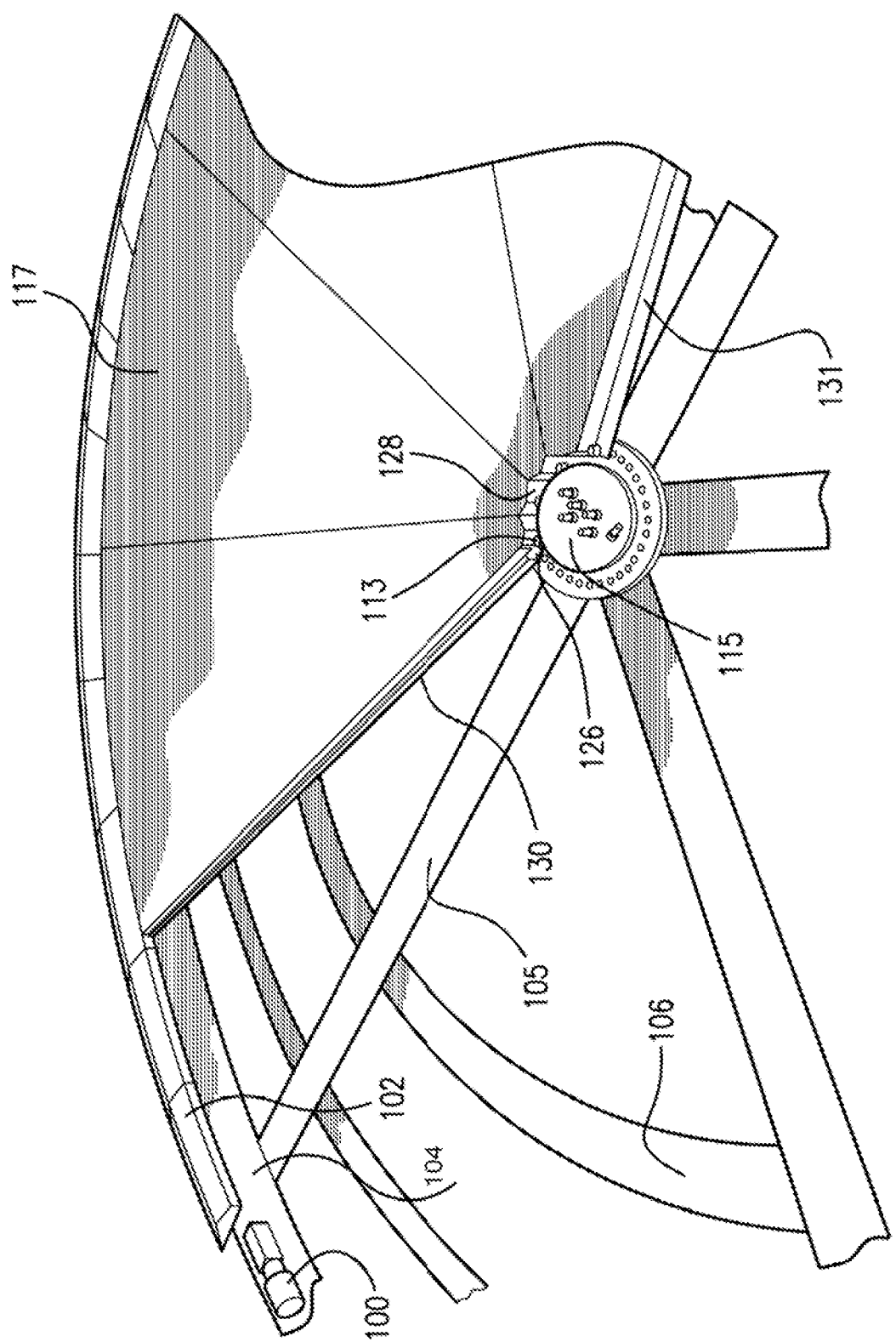
FIG. 12 is a cutaway perspective view of the turntable system.

FIG. 12 is a cutaway perspective view of the turntable system showing an example of an assembled drive motor unit (100), which is installed inside an individual ramp section (102). A perpendicular lateral band (105) is shown underlying an outer circular band (104). Each drive motor unit (100) sits on top of a portion of the outer circular rim band section (104).

Also is shown a foam filled wedge unit (117) with a tongued lateral wedge side unit (130) shown on the exposed side of it. On the lower right side of the drawing can be seen a grooved lateral wedge side unit (131). The upper outer center bearing hub (115) is shown along with the lower skin of a wedge shaped section (126) with upper outer center bearing hub bolts installed at (113) and the interior foam between the wedge sections shown as (128).

Figure 13:
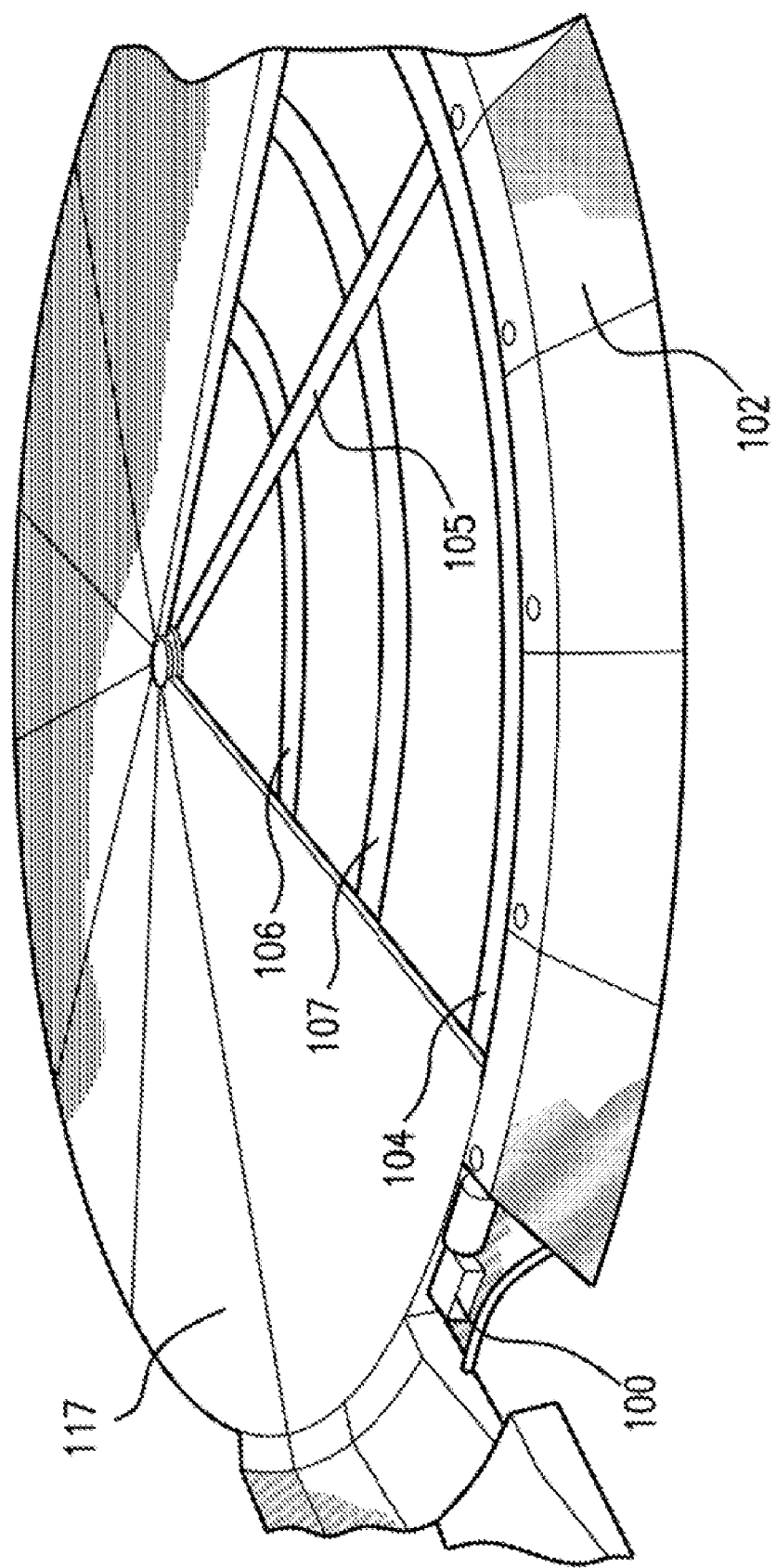
FIG. 13 is a perspective cut away view showing an assembled drive motor unit.

FIG. 13 is a perspective cut away view showing an assembled drive motor unit (100) which when assembled is inside an individual ramp section (102). Each foam filled wedge unit (117) is anchored to its neighbor by a tongue and groove connection system. The current preferred embodiment is to use 10 sections to form the rotating pan, but any number of sections forming the required circular pan could be used. In FIG. 31 the pan formed by the wedge shaped foam filled sections (117) is shown on top of an inner spider circular band (106) and a middle circular band (107), each of which is overlaid by a perpendicular lateral band (105). The top surface of each pan section (117) is composed of a non-skid specialty stainless steel surface. However any durable non-skid surface could be used. Also is shown an outer spider circular band (104) and a middle spider circular band (107).

Figure 14:
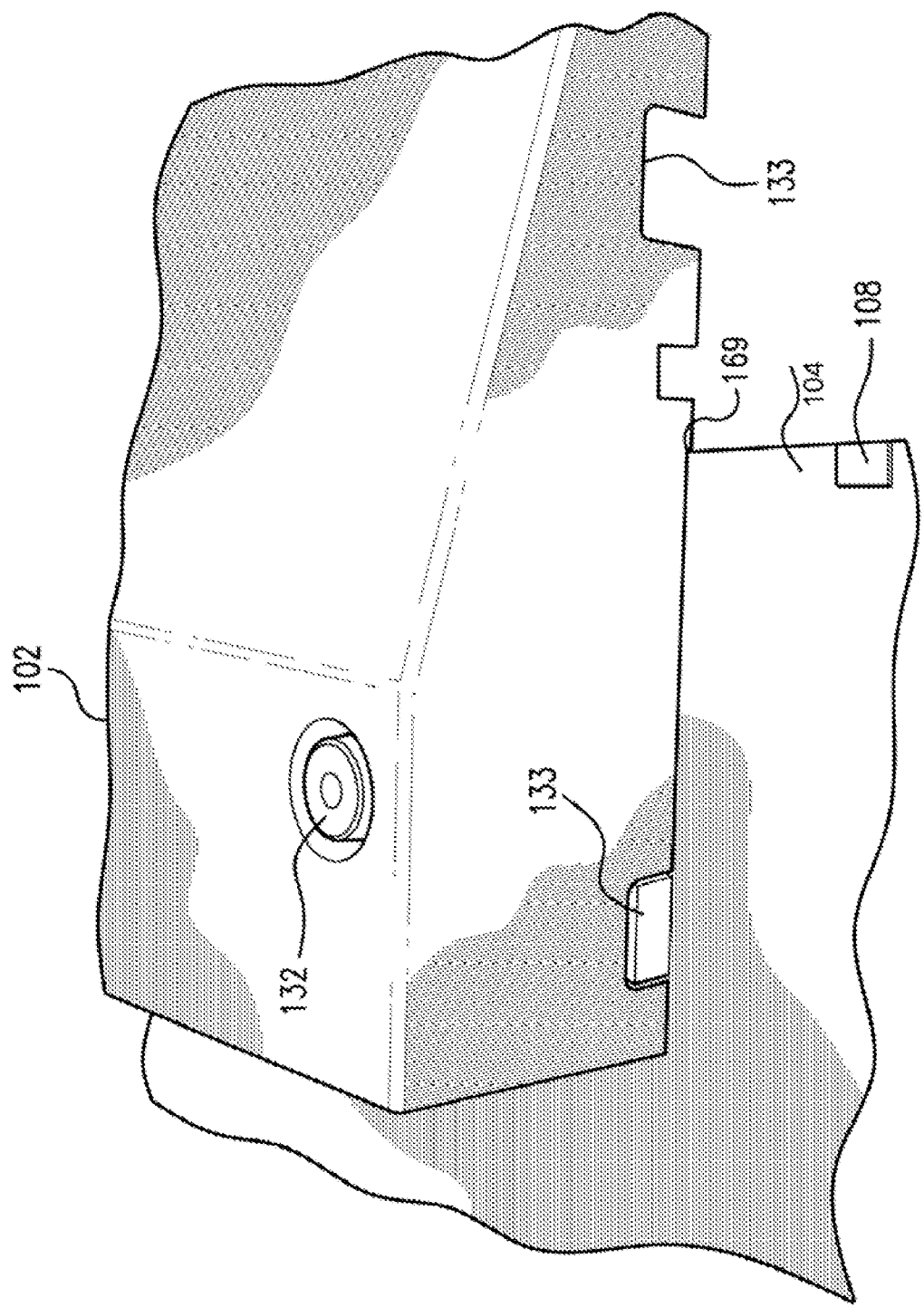
FIG. 14 shows a perspective view of an individual ramp section overlaying an outer circular rim band section of the spider system.

FIG. 14 shows a perspective view of an individual ramp section (102) overlaying an outer spider circular rim band section (104). Also is shown a Spider clip fastener (108) and an individual ramp section tongue notch cutout (133). Each individual ramp section tongue notch cutout (133) allows the tongue from its neighbor to lock the individual ramp section (102) to its neighbor. Also is shown the location of a typical spider pressure notch (169) which runs the longitudinal length of each ramp section (102) to allow the outer spider circular rim band (104) underneath each half of each ramp section (102) to assist more effectively in distributing the shock load of a car's tire when it first hits the ramp section (102) as the vehicles drive over them. (Or as loads are driven across the ramp sections) This notch is continuous and sits on top of the outer spider circular band (104). Also is shown the top of an individual ramp section anchor bolt (132). These anchor bolts (132) would eventually loosen if the spider pressure notch (169) was not present to distribute the shock load as the vehicle tires first hit the ramp sections (102).

Figure 15:
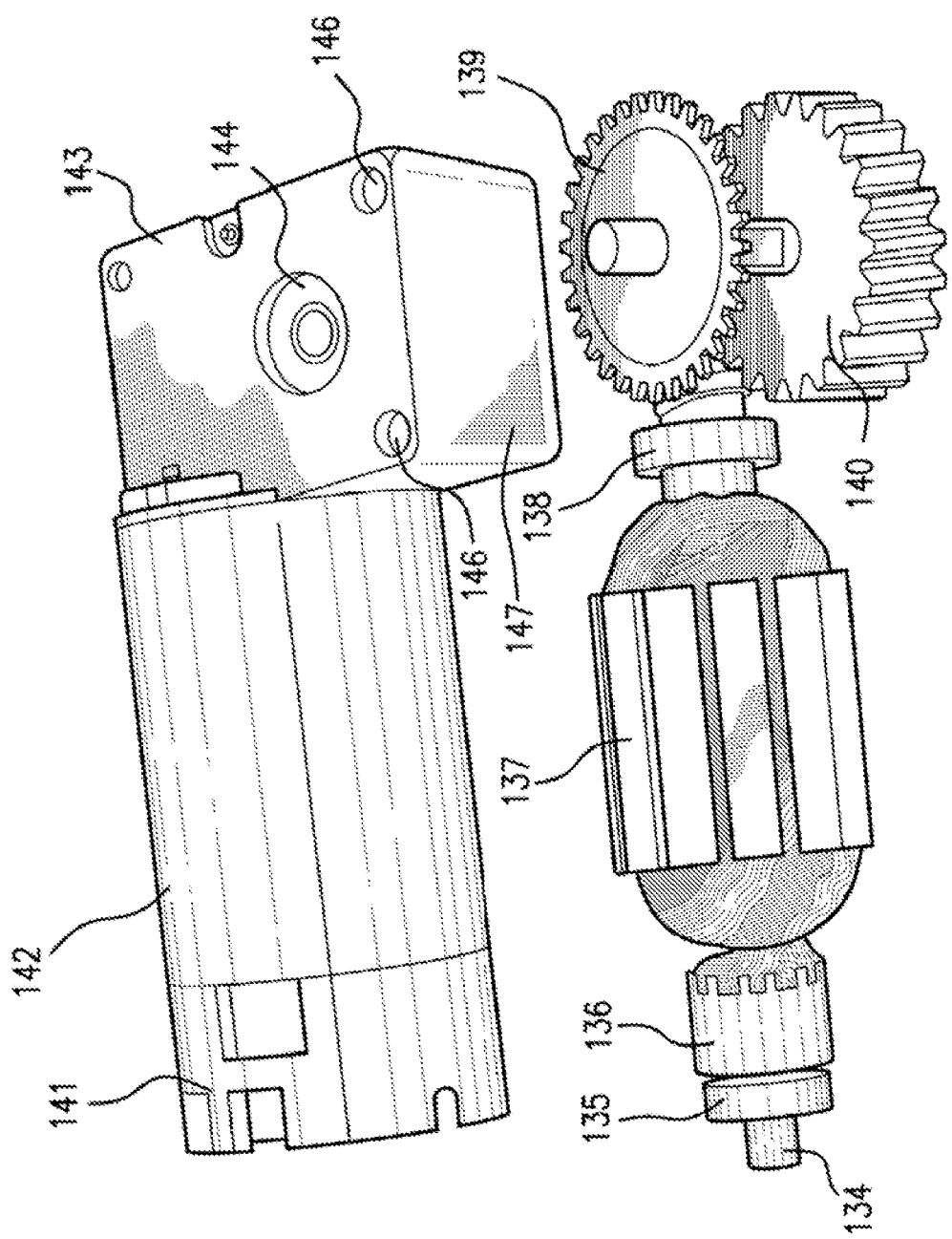
FIG. 15 shows a perspective view of an assembled motor drive unit as well as a number of the interior parts after disassembly.

FIG. 15 shows a perspective view of an assembled motor drive unit as well as a number of the interior parts after disassembly. The top drawing shows a rear drive motor casing (141) connected to the main drive motor casing (142). This is connected to the upper drive motor worm gear housing (143) which has a drive motor worm gear transfer axle (144) located inside it. Also shown are the drive motor worm gear housing sealing channels (146). In the lower drawing the drive motor worm gear housing (147) is also shown. The lower exploded view also shows the drive motor axle (134) upon which is placed the rear drive motor bushing (135) next to the drive motor secondary armature (136). This is connected to the drive motor primary armature (137) which is then connected to the front drive motor bushing (138). Also is shown the primary sprocket (139) directly connected to the worm drive transfer gear (140). The preferred embodiment uses a 24 volt direct drive electric motor which is entirely enclosed within an individual ramp section (102) to reduce the risk of electric shock.

Figure 16:
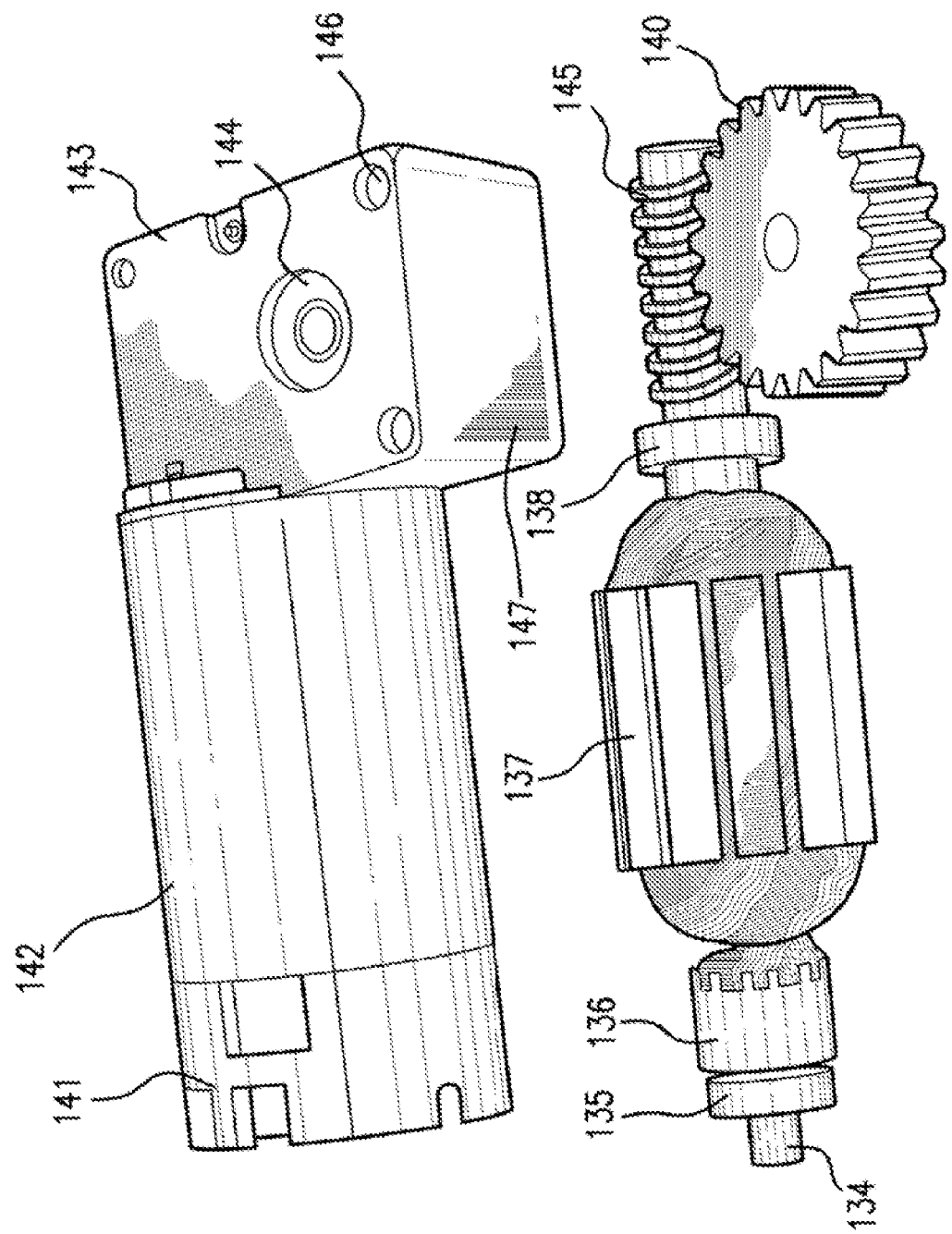
FIG. 16 shows a perspective view of an assembled motor drive unit enclosed as well as a number of its interior parts after disassembly to illustrate portions of the electric drive system worm gear obscured from view in FIG. 33.

FIG. 16 shows a perspective view of an enclosed assembled motor drive unit enclosed as well as a number of the interior parts after disassembly to illustrate portions of the electric drive system obscured from view in FIG. 15. The drive motor primary armature (137) is connected to the front drive motor bushing (138) which is directly connected to the worm gear (145). The worm gear connects directly to the worm drive transfer gear (140) which through the chain drive turns each drive roller so as to rotate the drive roller which is in contact with the circumference of the turntable. The rotation of the drive rollers actually rotates the turntable.

Figure 17:
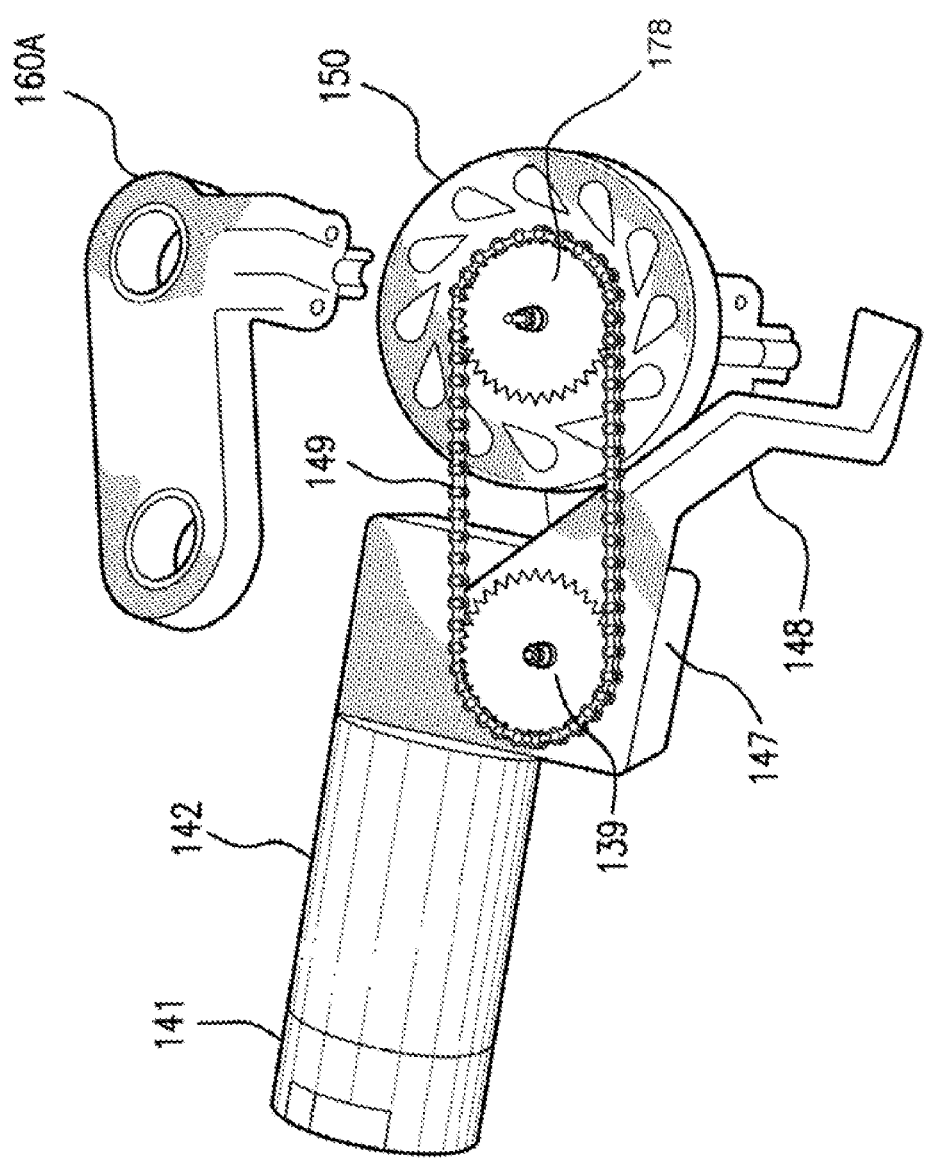
FIG. 17 shows an exploded view of the suspension system and chain drive system of a motor unit.

FIG. 17 shows an exploded view of the chain drive system which actually turns the drive rollers. It is comprised of an integrated suspension system and chain drive system. The rear drive motor casing (141) is connected to the main drive motor casing (142). The primary sprocket (139) is connected by a drive chain (149) to the drive roller sprocket (178) directly attached to the drive roller (150). The drive roller when operating pushes against the outside perimeter of the turntable pan to rotate the turntable when desired. Overlaying the assembly is the upper one half of the drive chain cover (160A). Also is shown the lower drive motor worm gear housing (147) and the suspension spring arm (148) which holds a spring to keep pressure on the drive roller. Another embodiment uses a drive system wherein each electric drive motor unit is mounted vertically rather than horizontally inside its individual ramp section, and the electric drive motor is directly connected to the drive roller which is in contact with the exterior circumference of the circle formed by the turntable's wedge shaped sections. Therefore no primary sprocket drive chain or drive roller sprocket is necessary tor the drive motor to turn the drive roller. In another embodiment, no chain is necessary because each electric drive motor unit could be comprised of an electric motor, a worm gear rotated by the electric motor, a worm drive transfer gear rotated by the worm gear, and a worm gear directly attached to the drive roller, so that the worm gear drives the roller directly, rather than through a chain drive mechanism.

Figure 18:
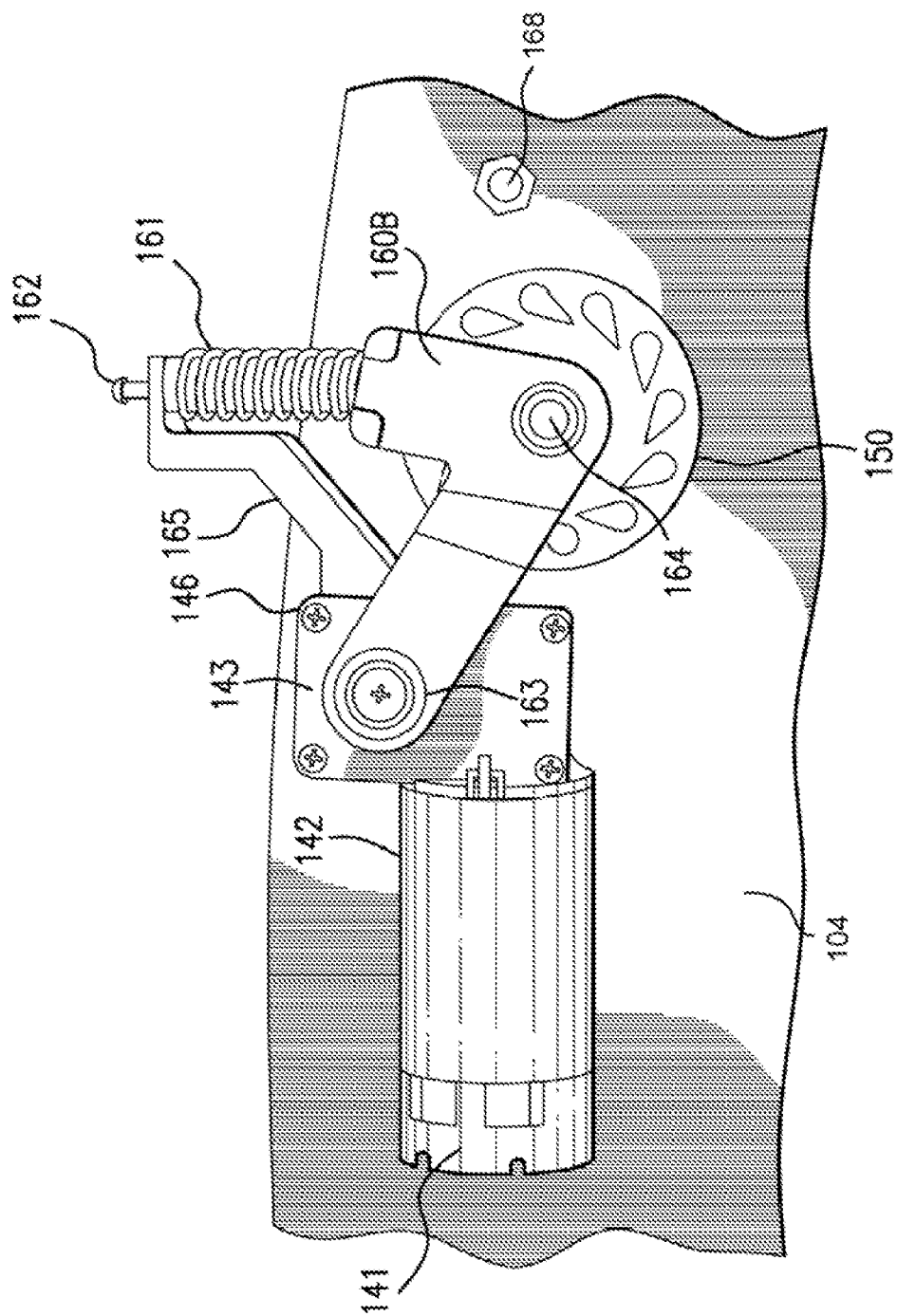
FIG. 18 shows an interior view of the "motorcycle type suspension" system which keeps tension on the drive rollers.

FIG. 18 shows a drive roller (150) which is in contact with the exterior outer circumference of the circle formed by the turntable's wedge shaped sections, and which when rotated, causes the turntable to rotate. It also shows an interior view of the swing arm suspension system (similar to that used in swing arms for motor cycle rear wheel suspension systems) connecting the main drive motor casing (142), and the upper drive motor worm gear housing (143) which is connected to the worm drive transfer gear axle (163) which holds the lower one half of the drive chain cover (160B). The upper and lower drive chain covers (160A and 160B) contain the drive roller axle (164) which holds the drive roller (150) in place, and supports a suspension spring (161), which keeps the drive chain at the proper tension and prevents twisting. In addition, these drive chain covers keep debris and dirt away from the chain and sprockets. In the present preferred embodiment this drive chain cover is an injection molded part. The "motorcycle type suspension" system is further comprised of the suspension spring (161) which is anchored by the installed suspension arm support pin (162). In the preferred embodiment, a drive roller (150) is kept under constant pressure by a suspension spring (161), the suspension spring (161) is suspended on an axle held in place by an upper drive chain cover (160A) on one side and a lower drive chain cover (160B) on the other side, the upper and lower drive chain covers (160A in FIG. 17 and 160B in FIG. 18) are attached at one end to the upper drive motor worm gear housing (143) and at the other end to one end of the suspension spring (161), the other end of the suspension spring is attached to a suspension arm (165), and the suspension arm is attached to the upper drive motor worm gear housing (143). This pin (162) rides in the installed suspension arm (165) which is connected to a drive motor worm gear housing sealing channel (146). Also is shown the upper drive motor worm gear housing (143). Having the motors inside the ramps themselves keeps the vertical profile of the turntable low because the drive motors will fit within the desired low profile.

Figure 19:
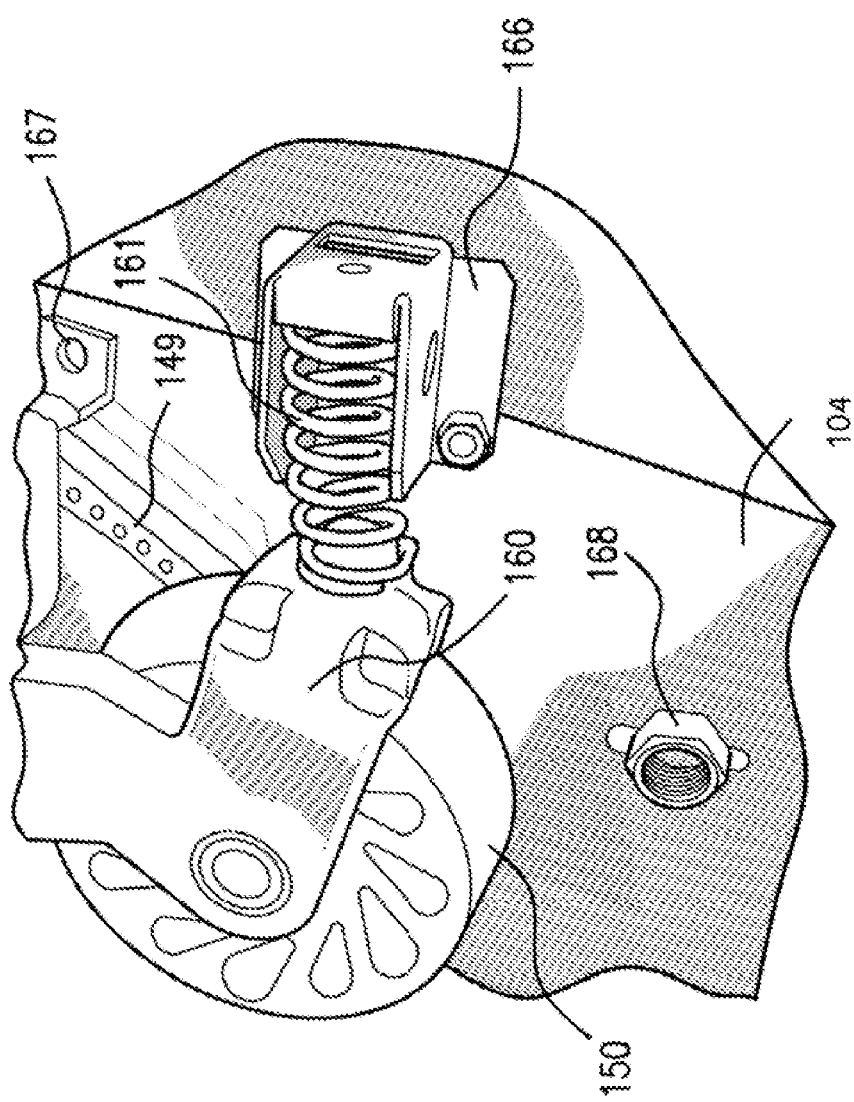
FIG. 19 shows an interior view of the drive roller.

FIG. 19 shows an interior view of the drive roller (150) contained within the drive chain covers (160) suspended by the suspension spring (161) enclosed in the suspension spring holder (166). An outer spider circular rim band section (104) containing an individual ramp section anchor nut (168) is also shown. In the upper portion of the drawing can be seen a drive assembly anchor band (167) which covers the drive chain (149).

Figure 20:
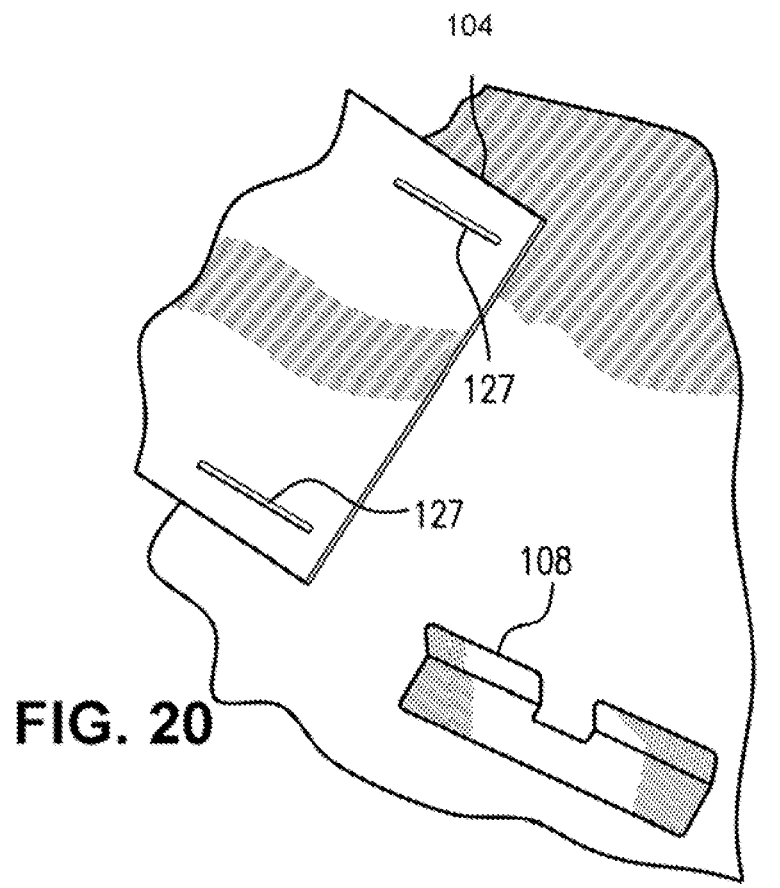
FIG. 20 shows a perspective view of a circular rim band section about to be fastened down with a clip fastener.

FIG. 20 shows a perspective view of a circular band section (104) about to be fastened down with a clip fastener (108).

Figure 21:
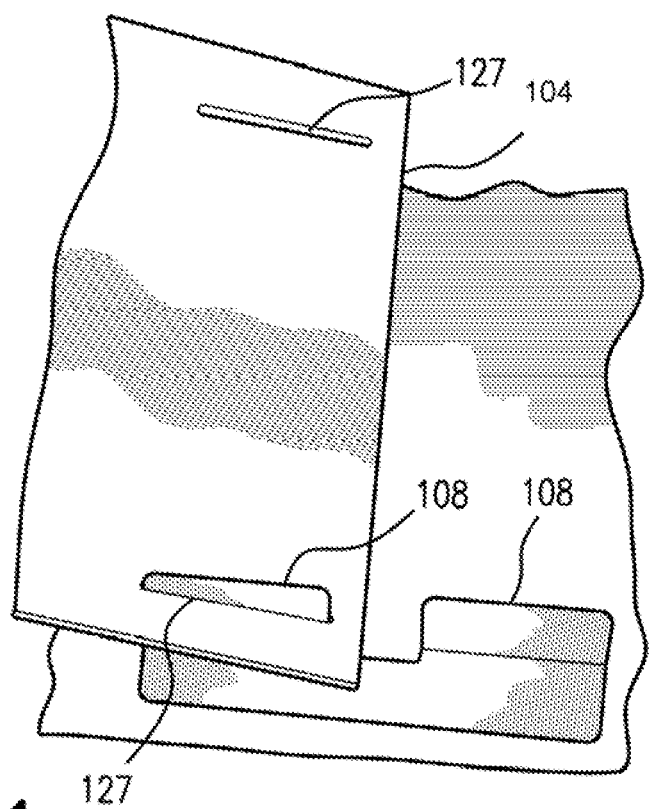
FIG. 21 shows a perspective view of a circular rim band section about to be fastened together with a clip fastener after inserting it into an anchor notch.

FIG. 21 shows a perspective view of a circular rim band section (104) about to be fastened together with a clip fastener (108) by inserting it into an anchor notch (127). The clip fastener (108) is anchored to the circular rim band section by any suitable metal to metal fastening means including but not limited to spot welding, epoxy gluing, bolting with flush mounted screws etc.

Figure 22:
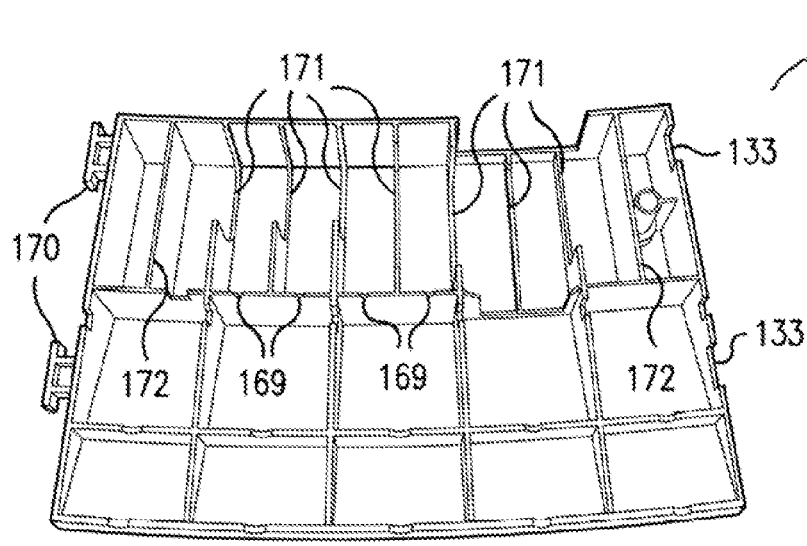
FIG. 22 shows a bottom view of an individual ramp section designed to have a drive motor inserted into it.
Figure 23:
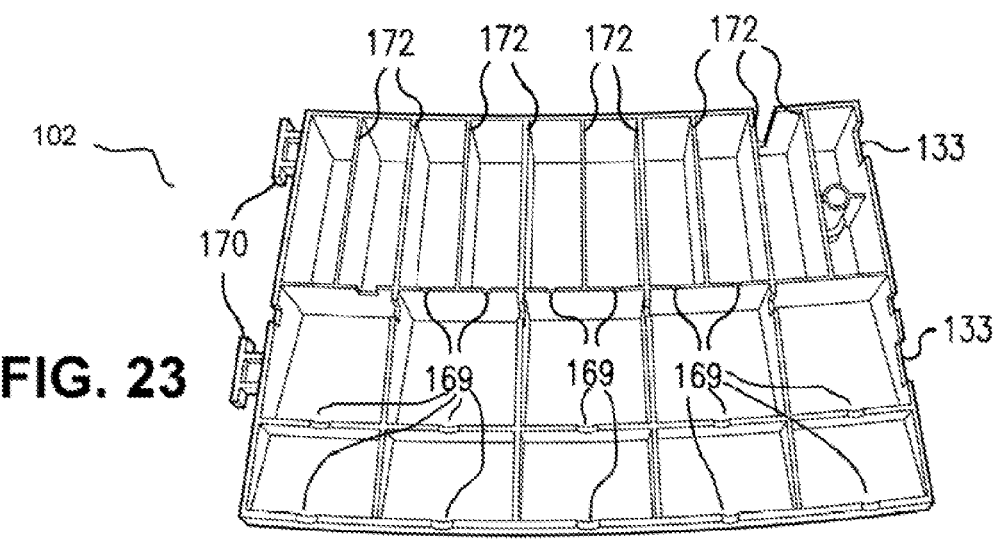
FIG. 23 shows a bottom view of an individual ramp section not designed to have a drive motor inserted into it.
Figure 24:
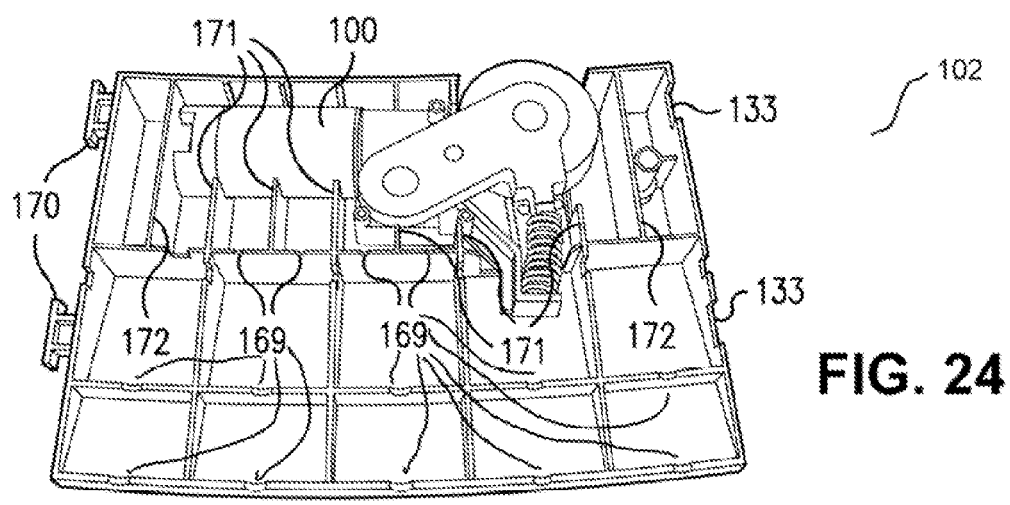
FIG. 24 shows a bottom view of an individual ramp section with an individual drive roller inserted into it.

FIGS. 22, 23 and 24 are all bottom views of representative individual ramp sections (102).

FIG. 40 shows a bottom view of an individual ramp section (102) designed to have a drive motor inserted into it showing the plurality of water draining notches (169) along the length of each ramp section (102). The individual ramp sections is each designed so that there are pressure notches placed on the bottom of each section to match the height of the concentric circular and perpendicular lateral bands they sit on when installed. These pressure notches are designed to distribute evenly the weight of vehicles between the concentric circular and lateral perpendicular rim band sections of the spider and the surface the spider rests upon when a vehicle drives over the ramp sections as the load moves onto the turntable pan itself. Also is shown a rib support (172), a number of sized motor recess ramp rib cutout areas (171), tongues (170) for joining each ramp section next to it's neighbor, and individual ramp section tongue notch cut outs (133) on the opposite side of each ramp.

FIG. 23 shows a bottom view of an individual ramp section (102) not designed to have a drive motor inserted into it. The tongues (170) can be seen on the left side while the individual ramp section tongue notch cut outs (133) are shown on the right. Also is shown the water draining notches (169) which runs the longitudinal length of each ramp section (102) Also the ramp ribs (172) placed vertically throughout the ramp section for support and strength are shown.

FIG. 24 shows a bottom view of an individual ramp section (102) with an individual drive motor unit (100) inserted into it. The previously described spider water draining notch (169), the individual ramp section tongue notch cut outs (133) and the tongues (170) can be seen also.

Although the present invention has been described in considerable detail with reference to certain preferred versions thereof, other versions are possible. For example clips instead of springs can be used as described above in FIG. 9. Different numbers and power capacities of electric motors can be used. Different types of non-stick surfaces can be use as well. Therefore the spirit and scope of the appended claims should not be limited to the description of the preferred versions contained therein. All the features disclosed in this specification (including any accompanying claims, abstracts, and drawings) may be replaced by alternative features serving the same, equivalent or similar purposes, unless expressly stated otherwise. Thus, unless expressly stated otherwise, each feature disclosed is one example only of a generic series of equivalent or similar features.

I claim:

1. A low profile turntable device comprising:
    a. a turntable comprised of a plurality of sections, each section being constructed of a wedge shaped top and bottom skin with a layer of structural foam in between;
    b. each wedge shaped section joined to a neighboring wedge shaped section so as to form a circle;
    c. the circle of wedge shaped sections joined at their narrow ends by a connector means to form a central rotational axis point;
    d. the central rotational axis point supported by a bearing means to allow the circle of wedge shaped sections to rotate in either direction around the rotational axis point;
    e. each bottom skin riding on a plurality of support wheels installed within it;
    f. suspension springs attached to the wheels,
    g. a continuous ramp around the exterior of the turntable comprised of individual ramp sections;
    h. a plurality of reversible drive units located inside one or more of the individual ramp sections around the exterior of the turntable to rotate the turntable continuously in either direction
    i. each drive unit turning a drive roller in direct contact with the exterior circumference of the turn table;
    j. an electrical switching control means to start, stop and reverse the drive mechanism;
    k. a source of power means to operate the reversible drive mechanism,
    l. there are a plurality of concentric circular bands underneath the turntable bottom skin;
    m. each of said concentric circular bands being connected to one or more neighboring concentric circular bands by perpendicular lateral bands which intersect at a central axis point;
    n. a lower center hub assembly anchored to the central axis point of the perpendicular lateral bands;
    o. an upper outer center bearing hub at the rotational axis point of the narrow ends of the wedge shaped sections;
    p. the upper outer center bearing hub affixed by a bearing means so as to rotate on top of the lower center hub assembly.

2. The device in claim 1 wherein the concentric circular and perpendicular bands are composed of any strong and durable metal.

3. The device in claim 1 wherein the concentric and lateral perpendicular bands are anchored together by clip fasteners.

4. The device in claim 1 wherein:
    a. the outermost, widest, curved end of each foam-flied wedge shaped section is bent into a channel shape by using an angle bender means;
    b. the wide end of the top skin of each foam-filled wedge shaped section is attached to the upper distal end of the channel formed in the outermost, widest, curved end.

5. The device in claim 4 wherein a drill means is used to place mounting holes in the mounting band area of the outermost, widest, curved end, and the skin is mounted by bolts placed in these mounting holes.

6. The device in claim 5 wherein the drill means used is a laser cutter.

7. The device in claim 1 wherein the wheels on the bottom of each foam-filled wedge shaped section are tapered at a slight angle with the end of the wheel towards the narrow end of the wedge shaped section being smaller, said angle allowing each wheel to roll in its circular path with a minimum of friction.

8. The device in claim 1 wherein:
a. each electric drive motor unit is comprised of an electric motor;
b. a worm gear rotated by the electric motor;
c. a worm drive transfer gear rotated by the worm gear;
d. a worm gear directly attached to the drive roller.

9. The device in claim 8 wherein:
a. the worm gear is connected directly by an axle to a primary sprocket;
b. the primary sprocket is connected by a drive chain to a drive roller sprocket;
c. the drive roller sprocket is connected to a drive roller;
d. the drive roller in direct contact with the exterior Outer circumference of the turntable 10. The device in claim 1 wherein:
a. the drive roller is kept under constant pressure by a suspension spring;
b. the suspension spring being suspended on an axle held in place by an upper drive chain cover on one side and a lower drive chain cover on the other side;
c. the upper and lower drive chain covers being attached at one end to the upper drive motor worm gear housing and at one end to the suspension spring;
c. the other end of the suspension spring being attached to a suspension arm; and
d. the suspension arm being attached to the upper drive motor worm gear housing.

11. The device in claim 1 wherein the individual ramp sections with drive motor units in them have rib cut out areas to accommodate each drive motor unit.

12. The device in claim 1 wherein the individual ramp sections each have a plurality of water draining notches along the bottom portion of a plurality of ribs attached to the underside of each ramp section.

13. The device in claim 1 wherein each individual ramp section of the turntable contains a plurality of pressure notches placed in each individual ramp section at the depth of the concentric circular bands and perpendicular bands placed beneath it to more effectively distribute the weight as each individual ramp section is compressed from above.

* * * * *